(12) United States Patent
Sengoku et al.

(10) Patent No.: US 8,970,766 B2
(45) Date of Patent: Mar. 3, 2015

(54) IMAGING DEVICE

(71) Applicant: Olympus Corporation, Tokyo (JP)

(72) Inventors: Tomoyuki Sengoku, Tokyo (JP);
Yoshinobu Tanaka, Tokyo (JP); Takashi Yanada, Tokyo (JP); Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 145 days.

(21) Appl. No.: 13/727,200

(22) Filed: Dec. 26, 2012

(65) Prior Publication Data

US 2013/0162881 A1 Jun. 27, 2013

(30) Foreign Application Priority Data

Dec. 27, 2011 (JP) ................. 2011-286028

(51) Int. Cl.
*H04N 5/222* (2006.01)
*H04N 5/235* (2006.01)
*H04N 5/232* (2006.01)

(52) U.S. Cl.
CPC ........... *H04N 5/23293* (2013.01); *H04N 5/232* (2013.01); *H04N 5/23232* (2013.01)
USPC .................. 348/333.11; 348/222.1

(58) Field of Classification Search
CPC ... H04N 5/2356; G02B 15/173; G02B 27/646
USPC ............ 348/220.1, 221.1, 222.1, 333.11, 345
See application file for complete search history.

(56) References Cited

U.S. PATENT DOCUMENTS

| 6,798,597 | B1* | 9/2004 | Aram et al. ............. 360/68 |
| 7,852,368 | B2* | 12/2010 | Moon ................. 348/14.01 |
| 7,990,429 | B2* | 8/2011 | Saito ................. 348/222.1 |
| 2010/0053342 | A1* | 3/2010 | Hwang et al. ........ 348/207.99 |
| 2010/0202711 | A1* | 8/2010 | Kondo et al. ............ 382/254 |

FOREIGN PATENT DOCUMENTS

| JP | 2005-039710 A | 2/2005 |
| JP | 2005-252484 A | 9/2005 |
| JP | 2007-336599 A | 12/2007 |

* cited by examiner

*Primary Examiner* — Trung Diep
(74) *Attorney, Agent, or Firm* — Westerman, Hattori, Daniels & Adrian, LLP

(57) ABSTRACT

An imaging device includes an image data interface unit that outputs the first image data according to a pixel signal from a solid-state imaging device, an image data reading unit that reads image data from a storage unit and outputs the read image data as second image data, an image synthesizing unit that outputs third image data in which the first image data is synthesized with the second image data, an evaluation value generating unit that generates an evaluation value based on image data, a first image data selecting unit that inputs selected image data to the evaluation value generating unit, an image data writing unit that stores input image data in the storage unit via the data bus, a second image data selecting unit that inputs selected image data to the image data writing unit, and a display unit that displays an image corresponding to the third image data.

15 Claims, 10 Drawing Sheets

IMAGING DEVICE

BACKGROUND OF THE INVENTION

1. Field of the Invention

The present invention relates to an imaging device.

Priority is claimed on Japanese Patent Application No. 2011-286028 filed on Dec. 27, 2011, the content of which is incorporated herein by reference.

2. Description of Related Art

In recent years, imaging devices such as digital cameras have come equipped with an auto focus (AF) function. As a method of implementing an AF function in an imaging device according to a related art, so-called imager AF has been known that uses hill-climbing control of detecting a focusing position on a subject by sequentially moving the position of a focus lens in a predetermined direction based on a pixel signal output from a solid-state imaging device (hereinafter referred to as an "image sensor"). In the imager AF, an AF evaluation value used to perform AF control is generated based on a pixel signal output from an image sensor in real time, and the position of a focus lens is controlled based on the generated AF evaluation value (see Japanese Unexamined Patent Application, First Publication 2005-252484).

FIG. 9 is a block diagram illustrating a schematic configuration of an imaging device according to a related art. Referring to FIG. 9, an imaging device includes an image sensor, an imaging processing unit, an image processing unit, a Dynamic Random Access Memory (DRAM) controller, a DRAM, a display processing unit, a display device, and a central processing unit (CPU). Further, the imaging processing unit, the image processing unit, the display processing unit, the CPU, and the DRAM controller which are included in the imaging device are connected to a common data bus, and data passing when each component performs processing is performed via the data bus. FIG. 9 also illustrates a schematic configuration of the imaging processing unit. Referring to FIG. 9, the imaging processing unit includes an imaging interface (IF) unit, a pre-processing unit, an AE evaluation value generating unit, an AWB evaluation value generating unit, an AF evaluation value generating unit, and an output Direct Memory Access (DMA) unit.

In the imaging device of the related art illustrated in FIG. 9, the imaging IF unit acquires a pixel signal from the image sensor, and outputs the acquired pixel signal to the pre-processing unit as image data. The pre-processing unit executes various kinds of processing on the image data input from the imaging IF unit. FIG. 9 illustrates an example of the pre-processing unit including three processing units that perform processing. The pre-processing unit outputs final image data obtained by performing sequential processing by the respective processing units to the AE evaluation value generating unit, the AWB evaluation value generating unit, the AF evaluation value generating unit, and the output DMA unit.

The output DMA unit stores the image data input from the pre-processing unit in the DRAM via the DRAM controller. Here, the image data stored in the DRAM is used as original image data which is to be subjected to image processing later by the image processing unit.

The AF evaluation value generating unit generates an AF evaluation value based on the image data input from the pre-processing unit. The AF evaluation value generating unit stores the generated AF evaluation value in the DRAM via the DRAM controller. The CPU uses the AF evaluation value stored in the DRAM and performs AF control in the imaging device according to the related art, that is, control of the position of a focus lens.

The AE evaluation value generating unit and the AWB evaluation value generating unit are evaluation value generating units that generate evaluation values used to perform control such as auto exposure (AE) and auto white balance (AWB) as capturing-related control other than AF in the imaging device according to the related art. The AE evaluation value generating unit and the AWB evaluation value generating unit generate an AE evaluation value and an AWB evaluation value, respectively, based on the image data input from the pre-processing unit, similarly to the AF evaluation value generating unit. The AE evaluation value generating unit and the AWB evaluation value generating unit store the generated AE evaluation value and the AWB evaluation value, respectively, in the DRAM via the DRAM controller. The CPU performs AE and AWB control in the imaging device according to the related art using the AE evaluation value and the AWB evaluation value stored in the DRAM.

The AF evaluation value generating unit, the AE evaluation value generating unit, and the AWB evaluation value generating unit may be configured to hold the generated AF evaluation value, AE evaluation value, and AWB evaluation value, respectively, in registers in the respective evaluation value generating units instead of storing the generated evaluation values in the DRAM. In the case of this configuration, the CPU receives a notice representing that generation of the evaluation values has been completed from the evaluation value generating units, and then reads the evaluation values held in the registers in the respective evaluation value generating units. The CPU performs AF, AE, and AWB control in the imaging device using the read evaluation values.

Through this configuration, in the imaging device according to the related art, each time a pixel signal is acquired from the image sensor, the AF evaluation value, the AE evaluation value, and the AWB evaluation value are generated, and capturing-related control is performed in the imaging device.

Further, in the imaging device according to the related art, there is a demand for an increase in the speed of the AF function, that is, an increase in the focusing speed. For this reason, in the imaging device in which the imager AF of the related art is mounted, a method of increasing the speed of reading a pixel signal from the image sensor, that is, a method of increasing a frame rate, is employed as a method of increasing the focusing speed. As the frame rate increases, the number of AF evaluation values, each of which is obtained each time the pixel signal is acquired from the image sensor, that is, for each imaged frame, increases.

The imaging device according to the related art has a so-called live view function of causing a moving image used to check a subject to be captured to be displayed on a display device such as a thin film transistor (TFT) liquid crystal display (LCD) or an electronic view finder (EVF) mounted in the imaging device. In the live view function, image data of each frame to be displayed on the display device is generated from a pixel signal of each frame acquired from the image sensor, and the image data of each frame is sequentially displayed on the display device in units of frames.

FIG. 10 is a timing chart illustrating an example of schematic timings of the image sensor and the display device included in the imaging device according to the related art. In the following description, in order to distinguish the frame rate of the image sensor from the frame rate of the display device, a frame rate at which the pixel signal is acquired from the image sensor is referred to as an "imaging frame rate." A frame rate at which the display device displays an image is referred to as a "display frame rate." In FIG. 10, the imaging frame rate of the image sensor is 120 fps (frame/second). FIG. 10 illustrates a timing relation between an captured image as image data according to the pixel signal acquired from the image sensor and a display image as image data to be displayed on the display device when the display frame rate of the display device is 60 fps.

In FIG. 10, a "vertical synchronous signal of an image sensor" refers to a signal representing a start timing at which the pixel signal of each frame is acquired from the image sensor. "Vertical synchronous signal of a display device" refers to a signal representing a timing at which the display device starts to display an image of each frame. In FIG. 10, a period of time of "AF process" is a period of time in which the AF evaluation value generating unit included in the imaging device generates the AF evaluation value based on the captured image, FIG. 10 illustrates a case in which the timing of the "vertical synchronous signal of the image sensor" is synchronized with the timing of the "vertical synchronous signal of the display device" for the sake of a simple comparison of a timing relationship between the captured image and the display image.

In the imaging device according to the related art, when the imaging frame rate of the image sensor is different from the display frame rate of the display device, a method of thinning out the captured image and then displaying the resultant image on the display device is employed as illustrated in FIG. 10. In FIG. 10, since the display frame rate is half the imaging frame rate, an captured image in which each frame is thinned out to half is used as the display image.

Further, for example, techniques disclosed in Japanese Unexamined Patent Application, First Publication 2005-39710 and Japanese Unexamined Patent Application, First Publication 2007-336599 have been known as techniques of displaying a synthesized image. In the techniques disclosed in Japanese Unexamined Patent Application, First Publication 2005-39710 and Japanese Unexamined Patent Application, First Publication 2007-336599, the number of frames of an captured image to be synthesized changes according to the display frame rate used for the display of the display device.

SUMMARY OF THE INVENTION

An imaging device according to a first aspect of the present invention includes an image data interface unit that outputs image data according to a pixel signal input from a solid-state imaging device as first image data, an image data reading unit that reads image data stored in a storage unit via a data bus, and outputs the read image data as second image data, an image synthesizing unit that generates and outputs third image data in which image data based on the first image data is synthesized with image data based on the second image data, an evaluation value generating unit that generates an evaluation value based on input image data, a first image data selecting unit that selects any one of image data based on the first image data, image data based on the second image data, and the third image data as image data to be input to the evaluation value generating unit, an image data writing unit that stores input image data in the storage unit via the data bus, a second image data selecting unit that selects any one of the image data based on the first image data, the image data based on the second image data, and the third image data as image data to be input to the image data writing unit, and a display unit that reads the third image data stored in the storage unit by the image data writing unit, from the storage unit via the data bus, and displays an image corresponding to the read third image data.

According to a second aspect of the present invention, the image data interface unit according to a first aspect of the present invention sequentially outputs the plurality of first image data according to the pixel data input from the solid-state imaging device during a unit period of time in which the display unit updates the display of an image. The second image data selecting unit selects the image data based on the first image data, which is initially output from the image data interface unit after the unit period of time of the display unit starts, as the image data to be input to the image data writing unit, and then selects the third image data sequentially input until the unit period of time of the display unit ends as the image data to be input to the image data writing unit. The image data writing unit sequentially stores the third image data input subsequently to the input initial image data based on the first image data in the storage unit. The image data reading unit sequentially reads the third image data stored in the storage unit, subsequently to the initial image data based on the first image data stored in the storage unit as the second image data. The image synthesizing unit sequentially outputs the third image data in which the image data based on the first image data sequentially output from the image data interface unit is sequentially synthesized with the image data based on the second image data read by the image data reading unit. The display unit displays an image corresponding to the third image data that is stored in the storage unit and finally synthesized by the image synthesizing unit when the unit period of time of the display unit ends. The first image data selecting unit sequentially selects any one of the image data based on the first image data sequentially output from the image data interface unit, the image data based on the second image data sequentially read by the image data reading unit, and the third image data sequentially synthesized by the image synthesizing unit as the image data to be input to the evaluation value generating unit during the unit period of time of the display unit. The evaluation value generating unit sequentially generates an evaluation value based on the sequentially input image data.

According to a third aspect of the present invention, the imaging device according to the second aspect of the present invention further includes a first pre-processing unit that performs predetermined processing on input image data and a second pre-processing unit that performs predetermined processing on input image data. The first pre-processing unit outputs image data in which predetermined processing is performed on one of the input first image data and the second image data as fourth image data. The second pre-processing unit outputs image data in which predetermined processing is performed on the other of the input first image data and the second image data as fifth image data. The image synthesizing unit generates third image data in which image data based on the fourth image data is synthesized with the fifth image data. The first image data selecting unit selects any one of the third image data, the fourth image data, and the fifth image data as the image data to be input to the evaluation value generating unit. The second image data selecting unit selects any one of the third image data, the fourth image data, and the fifth image data as the image data to be input to the image data writing unit.

According to a fourth aspect of the present invention, the imaging device according to the third aspect of the present invention further includes an image reducing unit that is arranged between the image data interface unit and the image synthesizing unit, and generates and outputs sixth image data in which input image data is reduced to a predetermined size.

According to a fifth aspect of the present invention, the image reducing unit according to the fourth aspect of the present invention is arranged between the first pre-processing unit and the image synthesizing unit, and generates sixth image data in which the fourth image data is reduced to a predetermined size. The image synthesizing unit generates third image data in which the sixth image data is synthesized with the fifth image data.

According to a sixth aspect of the present invention, the image reducing unit according to the fourth aspect of the present invention is arranged between the image data interface unit and the first pre-processing unit, and generates the sixth image data in which the first image data is reduced to a predetermined size. The image reducing unit outputs the generated sixth image data as the first image data to be input to the first pre-processing unit and the second pre-processing unit. The image synthesizing unit generates third image data in which the fourth image data is synthesized with the fifth image data.

According to a seventh aspect of the present invention, in the imaging device according to the fifth or sixth aspect of the present invention, the predetermined size is the size of image data corresponding to the size of an image that is displayable by the display unit.

According to an eighth aspect of the present invention, in the imaging device according to the fifth or sixth aspect of the present invention, the predetermined size is the size of image data necessary for the evaluation value generating unit to generate a valid evaluation value.

According to a ninth aspect of the present invention, in the imaging device according to the fifth or sixth aspect of the present invention further includes a second image reducing unit and an image enlarging unit. The second image reducing unit is arranged between the second image data selecting unit and the image data writing unit, reduces image data selected by the second image data selecting unit to a predetermined second size different from the size by the image reducing unit, and outputs the reduced image data as the image data to be input to the image data writing unit The image enlarging unit is arranged at a stage subsequent to the image data reading unit, enlarges the second image data read by the image data reading unit to the same size as the sixth image data output by the image reducing unit, and outputs the enlarged image data as the second image data to be input to the first pre-processing unit and the second pre-processing unit.

According to a tenth aspect of the present invention, in the imaging device according to the ninth aspect of the present invention, the predetermined size is the size of image data necessary for the evaluation value generating unit to generate a valid evaluation value. The predetermined second size is the size of image data corresponding to the size of an image that is displayable by the display unit.

According to an eleventh aspect of the present invention, the image synthesizing unit according to any one of the fifth to tenth aspects of the present invention outputs image data based on the sixth image data according to image data initially input to the image reducing unit after the unit period of time of the display unit starts as the third image data. Thereafter, the image synthesizing unit sequentially outputs the third image data in which the image data based on the sixth image data sequentially input from the image reducing unit until the unit period of time of the display unit ends is sequentially synthesized with the image data based on the second image data sequentially read by the image data reading unit. The second image data selecting unit selects the sequentially input third image data as the image data to be input to the image data writing unit during the unit period of time of the display unit.

According to a twelfth aspect of the present invention, the first pre-processing unit according to the eleventh aspect of the present invention is at least one processing unit that performs a predetermined correction process on input image data. The second pre-processing unit is at least one delay unit that performs a process of delaying input image data by a predetermined amount of time and outputting the delayed image data.

According to a thirteenth aspect of the present invention, in the imaging device according to the twelfth aspect of the present invention, the predetermined amount of time is equal to a delay time until the predetermined correction process is performed and corrected image data is output after image data is input to the first pre-processing unit.

According to a fourteenth aspect of the present invention, the first pre-processing unit according to the eleventh aspect of the present invention is at least one processing unit that performs a predetermined correction process on input image data. The second pre-processing unit is at least one second processing unit that performs a predetermined correction process on input image data.

According to a fifteenth aspect of the present invention, in the imaging device according to the thirteenth or fourteenth aspect of the present invention, the evaluation value generating unit may generate an evaluation value based on image data according to the pixel signal input from the solid-state imaging device. In this case, the first image data selecting unit selects any one of the fourth image data and the fifth image data based on the first image data as the image data to be input to the evaluation value generating unit. Further, the evaluation value generating unit may generate an evaluation value based on image data stored in the storage unit. In this case, the first image data selecting unit selects any one of the fourth image data and the fifth image data based on the second image data as the image data to be input to the evaluation value generating unit. Further, the evaluation value generating unit may generate an evaluation value based on the third image data. In this case, the first image data selecting unit selects the third image data as the image data to be input to the evaluation value generating unit.

According to a sixteenth aspect of the present invention, in the imaging device according to the fifteenth aspect of the present invention, the imaging device includes a plurality of evaluation value generating units and a plurality of first image data selecting units that correspond to the plurality of evaluation value generating units. Each of the first image data selecting units selects any one of the third image data, the fourth image data which is based on one of the first image data and the second image data, and the fifth image data which is based on one of the first image data and the second image data, which is used for the corresponding evaluation value generating unit to generate an evaluation value, as image data to be input to the corresponding evaluation value generating unit.

According to a seventeenth aspect of the present invention, in the imaging device according to the sixteenth aspect of the present invention, at least one of the first image data selecting units selects any one of the fourth image data and the fifth image data, which is based on one of the first image data and the second image data, which is used for the corresponding evaluation value generating unit to generate an evaluation value, as image data to be input to the corresponding evaluation value generating unit. At least another of the first image data selecting units selects the other of the fourth image data and the fifth image data, which is based on the other of the first image data and the second image data, which is used for the corresponding evaluation value generating unit to generate an evaluation value, or the third image data, as the image data to be input to the corresponding evaluation value generating unit.

DETAILED DESCRIPTION OF THE INVENTION

<First Embodiment>

Figure 1:
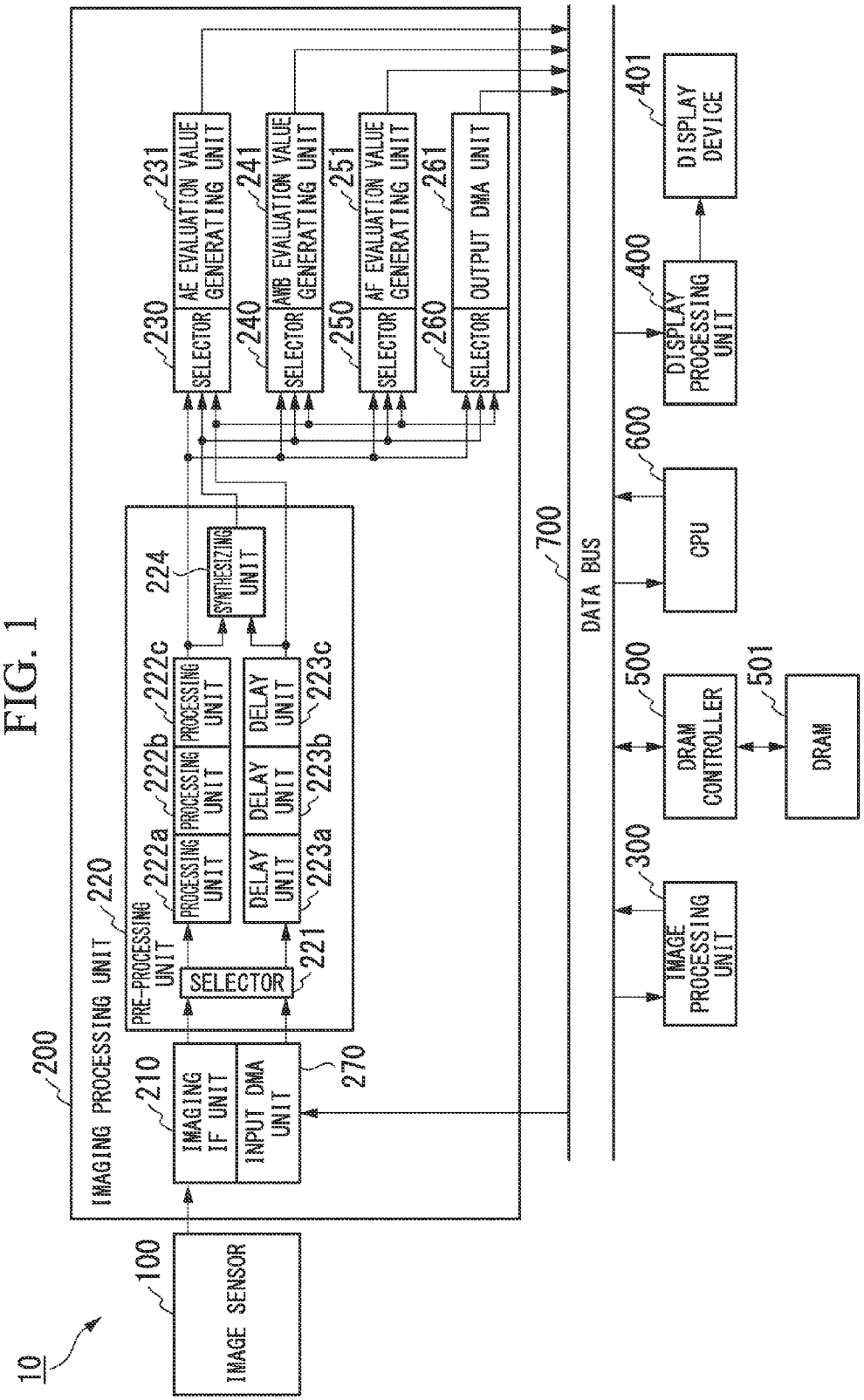
FIG. 1 is a block diagram illustrating a schematic configuration of an imaging device according to a first embodiment of the present invention.

Hereinafter, exemplary embodiments of the present invention will be described with reference to the accompanying drawings. FIG. 1 is a block diagram illustrating a schematic configuration of an imaging device according to a first embodiment. An imaging device 10 illustrated in FIG. 1 includes an image sensor 100, an imaging processing unit 200, an image processing unit 300, a display processing unit 400, a display device 401, a DRAM controller 500, a DRAM 501, and a CPU 600.

The imaging processing unit 200, the image processing unit 300, the display processing unit 400, the DRAM controller 500, and the CPU 600 in the imaging device 10 are connected to one another via a data bus 700. For example, reading of data from the DRAM 501 connected to the DRAM controller 500 and writing of data in the DRAM 501 are performed via a DMA.

Figure 9:
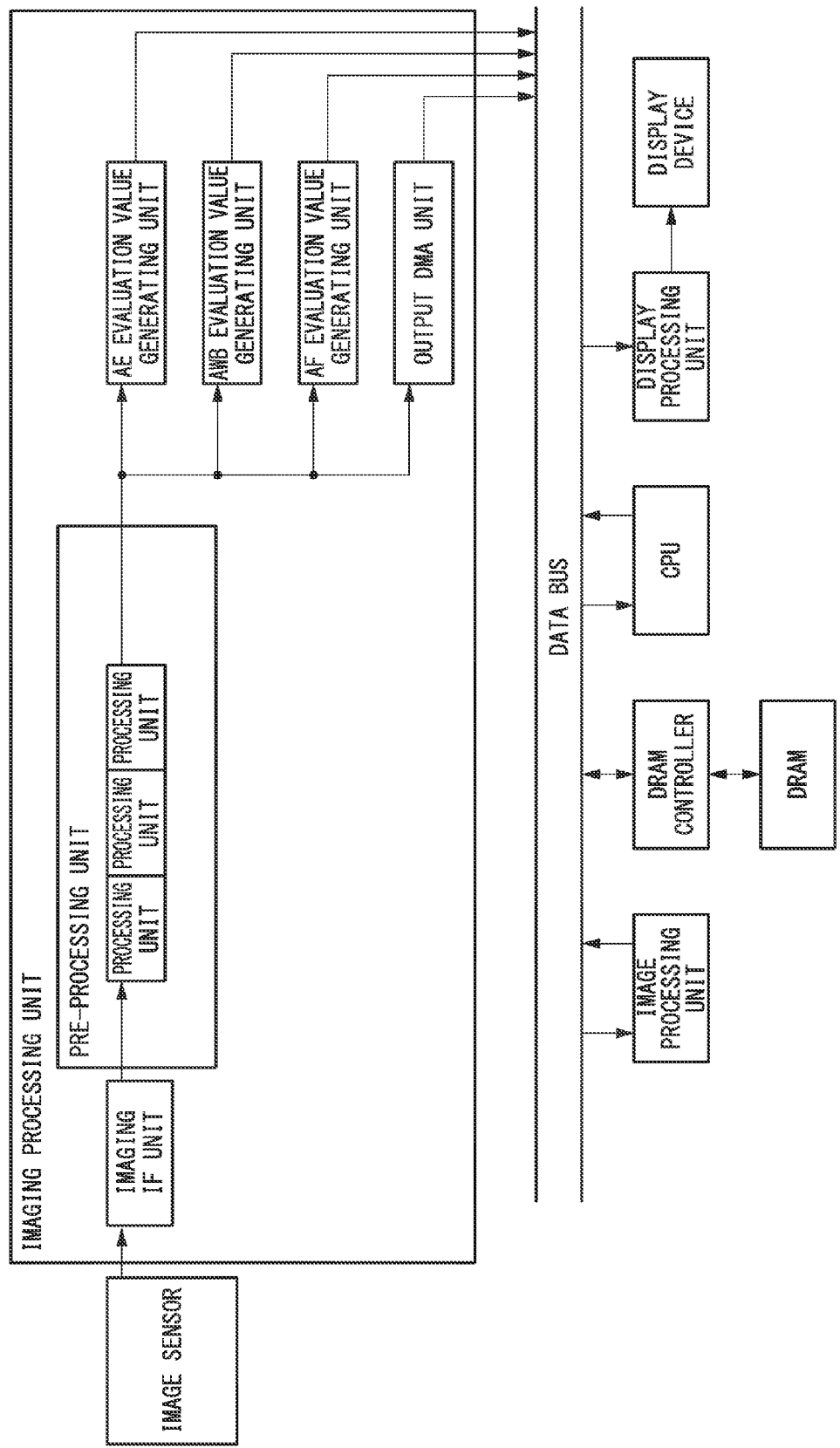
FIG. 9 is a block diagram illustrating a schematic configuration of an imaging device according to a conventional art.

The imaging device 10 illustrated in FIG. 1 includes components similar to those of the imaging device of the conventional art illustrated in FIG. 9. The imaging device 10 is different from the imaging device of FIG. 9 in that the imaging processing unit 200 has a different configuration from the imaging processing unit included in the imaging device according to the conventional art. FIG. 1 also illustrates a schematic configuration of the imaging processing unit 200 focusing on the imaging processing unit 200 having a different configuration from the imaging device according to the conventional art.

The imaging processing unit 200 included in the imaging device 10 includes an imaging IF unit 210, a pre-processing unit 220, a selector 230, an AE evaluation value generating unit 231, a selector 240, an AWB evaluation value generating unit 241, a selector 250, an AF evaluation value generating unit 251, a selector 260, an output DMA unit 261, and an input DMA unit 270.

The image sensor 100 is an image sensor represented by a charge coupled device (CCD) image sensor or a complementary metal-oxide semiconductor (CMOS) image sensor that performs photoelectric conversion on an optical image of a subject to be formed by a zoom lens (not shown).

In the image sensor 100, for example, a color filter of the Bayer array is attached to an imaging surface. The image sensor 100 outputs a pixel signal of each color (for example, R, Gr, Gb, and B) according to subject light to the imaging processing unit 200. The configuration and the operation of the image sensor 100 are similar to the configuration and the operation of the image sensor included in the imaging device according to the conventional art, for example, illustrated in FIG. 9, and thus a detailed description thereof will not be provided here.

The imaging processing unit 200 executes various kinds of processing on the pixel signal input from the image sensor 100, and generates an evaluation value used to perform capturing-related control (AE, AWB, and AF control) in the imaging device 10. The imaging processing unit 200 stores image data (hereinafter referred to as an "captured image") according to the pixel signal input from the image sensor 100 in the DRAM 501 via the DRAM controller 500.

The imaging processing unit 200 acquires (reads) the image data (the captured image) stored in the DRAM 501 via the DRAM controller 500. The imaging processing unit 200 generates the evaluation value used to perform the capturing-related control (AE, AWB, and AF control) in the imaging device 10 based on the acquired image data.

Further, the imaging processing unit 200 synthesizes image data (an captured image of a current frame) according to the pixel signal input from the image sensor 100 with image data (an captured image of a previous frame) acquired (read) via the DRAM controller 500. The imaging processing unit 200 generates the evaluation value used to perform the capturing-related control (AE, AWB, and AF control) in the imaging device 10 based on the synthesis image data. The imaging processing unit 200 stores the synthesis image data in the DRAM 501 via the DRAM controller 500.

The imaging IF unit 210 acquires the pixel signal input from the image sensor 100, and outputs the acquired pixel signal to the pre-processing unit 220 as the image data (the captured image of the current frame). The imaging IF unit 210 performs a sorting process of sorting data of pixel signals of each color input from the image sensor 100 in a color order of a pixel to be used for a subsequent process when outputting the image data to the pre-processing unit 220. The imaging IF unit 210 performs, for example, a process of terminating low voltage differential signaling (LVDS) when the image sensor 100 is an image sensor that outputs a pixel signal through a differential interface. The configuration and the operation of the imaging IF unit 210 are similar to the configuration and the operation of the imaging IF unit included in the imaging device of the conventional art illustrated in FIG. 9, and thus a detailed description thereof will not be provided here.

The pre-processing unit 220 executes various kinds of processes such as scratch correction and shading correction on the image data input from the imaging IF unit 210. The pre-processing unit 220 outputs image data of a processing result (hereinafter referred to as "pre-processed image data") to the selector 230, the selector 240, the selector 250, and the selector 260.

The pre-processing unit 220 outputs image data (hereinafter referred to as "delay image data") obtained by delaying the image data input from the input DMA unit 270 by a predetermined amount of time to the selector 230, the selector 240, the selector 250, and the selector 260.

The pre-processing unit 220 synthesizes the pre-processed image data with the delay image data, and outputs synthesis image data (hereinafter referred to as "synthesis image data") to the selector 230, the selector 240, the selector 250, and the selector 260.

As illustrated in FIG. 1, the pre-processing unit 220 includes a selector 221, three processing units 222a to 222c, three delay units 223a to 223c, and a synthesizing unit 224. FIG. 1 illustrates an example of the pre-processing unit 220 including the three processing units 222a to 222c that sequentially perform processing thereof, similarly to the pre-processing unit included in the imaging device of the related art illustrated in FIG. 9.

The selector 221 selects output destinations of the image data (the captured image of the current frame) input from the imaging IF unit 210 and the image data (the captured image of the previous frame) input from the input DMA unit 270. More specifically, the selector 221 outputs the image data input from the imaging IF unit 210 to either the processing unit 222a or the delay unit 223a. Further, the selector 221 outputs the image data input from the input DMA unit 270 to either the processing unit 222a or the delay unit 223a.

Each of the processing units 222a to 222c performs a predetermined process (a correction process) on the input image data. For example, the processing unit 222a performs a scratch correction process on the input image data. For example, the processing unit 222b performs a shading correction process on image data, which has been subjected to the scratch correction process, input from the processing unit 222a.

As described above, the processing units 222a to 222c sequentially performs the predetermined process (the correction process) on the input image data. Then, the processing unit 222c outputs the image data which has been subjected to the above process (correction process) to the selector 230, the selector 240, the selector 250, and the selector 260 as the pre-processed image data. The pre-processed image data is also output to the synthesizing unit 224. Further, configurations and operations of the processing units 222a to 222c are similar to the configurations and the operation of the three processing units included in, for example, the imaging device of the related art illustrated in FIG. 9, and thus a detailed description thereof will not be provided here.

The delay units 223a to 223c correspond to the processing units 222a to 222c, respectively, and delay the input image data by the same time as a delay time from an input to the processing units 222a to 222c to an output thereof and output the delay image data. For example, the delay unit 223a delays the input image data by the same time as a delay time (a processing time) delayed by the scratch correction process of the processing unit 222a, and outputs the delay image data. Further, for example, the delay unit 223b delays the image data delayed by the delay unit 223a by the same time as a delay time (a processing time) delayed by the shading correction process of the processing unit 222b, and outputs the delay image data.

As described above, the delay units 223a to 223c sequentially delay the input image data by the same time as the delay time (the processing time) of the corresponding processing units, and output the delay image data. Then, the image data delayed by the delay unit 223c is output to the selector 230, the selector 240, the selector 250, and the selector 260 as the delay image data. The delay image data is also output to the synthesizing unit 224.

The synthesizing unit 224 synthesizes the input pre-processed image data with the delay image data to generate synthesis image data. When the synthesizing unit 224 generates the synthesis image data, the synthesizing unit 224 executes a synthesis process such as an addition process, a subtraction process, a weighted addition process, and an averaging process on the input pre-processed image data and the delay image data, and generates the synthesis image data. Then, the synthesizing unit 224 outputs the generated synthesis image data to the selector 230, the selector 240, the selector 250, and the selector 260.

The selector 230 selects any one of the pre-processed image data, the delay image data, and the synthesis image data input from the pre-processing unit 220. The selector 230 outputs the selected image data to the AE evaluation value generating unit 231 as image data used to generate the AE evaluation value.

The AE evaluation value generating unit 231 calculates (generates) the AE evaluation value used for control exposure of the imaging device 10 based on the image data input from the selector 230. When the image sensor 100 is the image sensor with the Bayer array, the AE evaluation value generating unit 231 generates the AE evaluation value in which the image data input from the selector 230 is integrated for each color (R, Gr, Gb, and B). Then, the AE evaluation value generating unit 231 stores the generated AE evaluation value in the DRAM 501 via the DRAM controller 500. The configuration and the operation of the AE evaluation value generating unit 231 are similar to the configuration and the operation of the AE evaluation value generating unit included in, for example, the imaging device of the related art illustrated in FIG. 9, and thus a detailed description thereof will not be provided here.

The AE evaluation value generating unit 231 may be configured to hold the generated AE evaluation value in the register in the AE evaluation value generating unit 231 instead of storing the generated AE evaluation value in the DRAM 501. In this case, the CPU 600 receives a notice representing that generation of the AE evaluation value has been completed from the AE evaluation value generating unit 231, and then reads the AE evaluation value held in the register in the AE evaluation value generating unit 231. Further, the CPU 600 performs AE control in the imaging device 10 using the read AE evaluation value.

The selector 240 selects any one of the pre-processed image data, the delay image data, and the synthesis image data input from the pre-processing unit 220. The selector 240 outputs the selected image data to the AWB evaluation value generating unit 241 as image data used to generate the AWB evaluation value.

The AWB evaluation value generating unit 241 calculates (generates) the AWB evaluation value used to control the white balance of the imaging device 10 based on the image data input from the selector 240. When the image sensor 100 is the image sensor with the Bayer array, the AWB evaluation value generating unit 241 generates the AWB evaluation value used to adjust a white level based on the image data of each color (R, Gr, Gb, and B) input from the selector 240. Then, the AWB evaluation value generating unit 241 stores the generated AWB evaluation value in the DRAM 501 via the DRAM controller 500. The configuration and the operation of the AWB evaluation value generating unit 241 are similar to the configuration and the operation of the AWB evaluation value generating unit included in the imaging device of the related art, for example, illustrated in FIG. 9, and thus a detailed description thereof will not be provided here.

The AWB evaluation value generating unit 241 may be configured to hold the generated AWB evaluation value in the register in the AWB evaluation value generating unit 241 instead of storing the generated AWB evaluation value in the DRAM 501. In this case, the CPU 600 receives a notice representing that generation of the AWB evaluation value has been completed from the AWB evaluation value generating unit 241, and then reads the AWB evaluation value held in the register in the AWB evaluation value generating unit 241. The CPU 600 performs AWB control in the imaging device 10 using the read AWB evaluation value.

The selector 250 selects any one of the pre-processed image data, the delay image data, and the synthesis image data input from the pre-processing unit 220. The selector 250 outputs the selected image data to the AF evaluation value generating unit 251 as image data used to generate the AF evaluation value.

The AF evaluation value generating unit 251 calculates (generates) the AF evaluation value used to control the focus of the imaging device 10 based on the image data input from the selector 250. When the image sensor 100 is the image sensor with the Bayer array, the AF evaluation value generating unit 251 generates a brightness signal (a Y signal) based on image data of each color (R, Gr, Gb, and B) input from the selector 250. The AF evaluation value generating unit 251 generates the AF evaluation value based on the generated Y signal. Then, the AF evaluation value generating unit 251 stores the generated AF evaluation value in the DRAM 501 via the DRAM controller 500. The configuration and the operation of the AF evaluation value generating unit 251 are similar to the configuration and the operation of the AF evaluation value generating unit included in the imaging device of the related art, for example, illustrated in FIG. 9, and thus a detailed description thereof will not be provided here.

The AF evaluation value generating unit 251 may be configured to hold the generated AF evaluation value in the register in the AF evaluation value generating unit 251 instead of storing the generated AF evaluation value in the DRAM 501. In this case, the CPU 600 receives a notice representing that generation of the AF evaluation value has been completed from the AF evaluation value generating unit 251, and then reads the AF evaluation value held in the register in the AF evaluation value generating unit 251. The CPU 600 performs AF control in the imaging device 10 using the read AF evaluation value.

The selector 260 selects any one of the pre-processed image data, the delay image data, and the synthesis image data input from the pre-processing unit 220. The selector 260 outputs the selected image data to the output DMA unit 261 as original image data which is to be processed by the image processing unit 300 or the display processing unit 400.

The output DMA unit 261 stores the image data input from the selector 260 in the DRAM 501 via the DRAM controller 500 by the DMA. When the image sensor 100 is the image sensor with the Bayer array, image data of the Bayer array is stored in the DRAM 501 as image data (the Bayer data) to be processed by the image processing unit 300 or the display processing unit 400. The configuration and the operation of the output DMA unit 261 are similar to the configuration and the operation of the output DMA unit included in the imaging device of the related art, for example, illustrated in FIG. 9, and thus a detailed description thereof will not be provided here.

The input DMA unit 270 acquires (reads) the image data (the captured image of the previous frame) stored in the DRAM 501 by DMA via the DRAM controller 500. The input DMA unit 270 outputs the acquired image data to the pre-processing unit 220. The image data to be acquired by the input DMA unit 270 may be, for example, image data which is subjected to image processing by the image processing unit 300 and then stored in the DRAM 501 rather than image data stored by the output DMA unit 261.

The image processing unit 300 acquires (reads) the image data stored in the DRAM 501. The image processing unit 300 generates recording image data by executing various kinds of image processing such as a noise reduction process, a YC conversion process, a resizing process, a video compression process such as a JPEG compression process, an MPEG compression process, or an H.264 compression process on the acquired image data. Then, the image processing unit 300 stores (writes) the generated recording image data in the DRAM 501 again.

In addition, the image processing unit 300 acquires (reads) recording image data stored in the DRAM 501. The image processing unit 300 generates image data by executing various kinds of image processing including a video decompression process such as a JPEG decompression process, an MPEG decompression process, or an H.264 decompression process. Then, the image processing unit 300 stores (writes) the generated image data in the DRAM 501 again. The configuration and the operation of the image processing unit 300 are similar to the configuration and the operation of the image processing unit included in the imaging device of the related art, for example, illustrated in FIG. 9, and thus a detailed description thereof will not be provided here.

The display processing unit 400 acquires (reads) the image data stored in the DRAM 501. The display processing unit 400 generates display image data (hereinafter referred to as a "display image") by executing display image processing of resizing (reducing) the size of an image to a size which is possible to be displayed on the display device 401 or display processing of superimposing on-screen display (OSD) display data on the acquired image data. Then, the display processing unit 400 outputs the generated display image data (the display image) to the display device 401 or an external display (not shown). The configuration and the operation of the display processing unit 400 are similar to the configuration and the operation of the display processing unit included in the imaging device of the related art, for example, illustrated in FIG. 9, and thus a detailed description thereof will not be provided here.

The display processing unit 400 may be configured to execute only display processing such as the process of superimposing the OSD display data. In this case, for example, the display processing unit 400 generates display image data by executing display image processing on the image data or the recording image data read from the DRAM 501 via the image processing unit 300. The display processing unit 400 stores (writes) the generated display image data in the DRAM 501 again. Then, the display processing unit 400 acquires (reads) the display image data stored in the DRAM 501, and executes display processing such as the process of superimposing OSD display data on the acquired display image data.

The display device 401 is a display device such as a TFT LCD or an organic electroluminescence (EL) display. The display device 401 displays an image according to the display image data (the display image) output from the display processing unit 400. For example, the display device 401 is the same as the display device included in the imaging device of the related art illustrated in FIG. 9, and thus a detailed description thereof will not be provided here.

The DRAM controller 500 performs control of storing (writing) data in the connected DRAM 501 and acquiring (reading) data from the DRAM 501 according to an access request to the DRAM 501 from a plurality of components in the imaging device 10 connected to the data bus 700, for example, an access request of the DMA. The configuration and the operation of the DRAM controller 500 are similar to the configuration and the operation of the DRAM controller included in the imaging device of the related art, for example, illustrated in FIG. 9, and thus a detailed description thereof will not be provided here.

The DRAM 501 is a memory in which an access is controlled by the DRAM controller 500. The DRAM 501 records various kinds of data in the processing process of the components in the imaging device 10. The DRAM 501 is the same as the DRAM included in the imaging device of the related art, for example, illustrated in FIG. 9, and thus a detailed description thereof will not be provided here.

The CPU 600 controls the components of the imaging device 10, that is, the imaging device 10 in general. For example, the CPU 600 controls an operation of each component in the imaging device 10 according to a capturing operation or a reproducing operation in the imaging device 10. For example, the CPU 600 controls a start of an output of a pixel signal from the image sensor 100 and a start of acquisition of a pixel signal by the imaging IF unit 210 when the imaging device 10 performs the capturing operation.

Further, the CPU 600 performs setting and control of the processing units 222a to 222c in the pre-processing unit 220, setting and control of the AE evaluation value generating unit 231, the AWB evaluation value generating unit 241, and the AF evaluation value generating unit 251, and setting of the output DMA unit 261 and the input DMA unit 270. Furthermore, the CPU 600 controls selection of image data by the selector 221, the selector 230, the selector 240, the selector 250, and the selector 260 in the pre-processing unit 220.

Figure 2A:
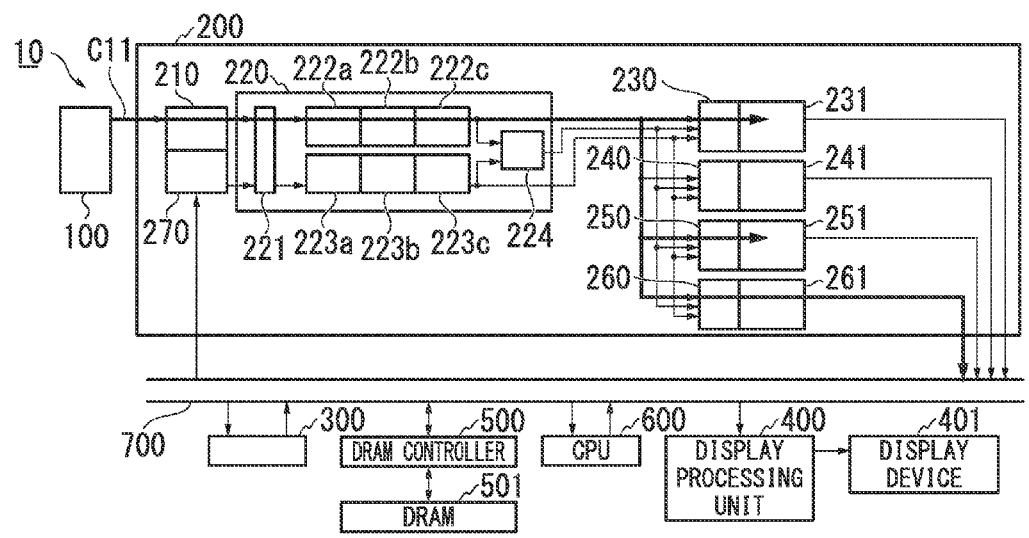
FIG. 2A is a diagram schematically illustrating an example of an evaluation value generating operation and an image display operation by the imaging device according to the first embodiment.
Figure 2B:
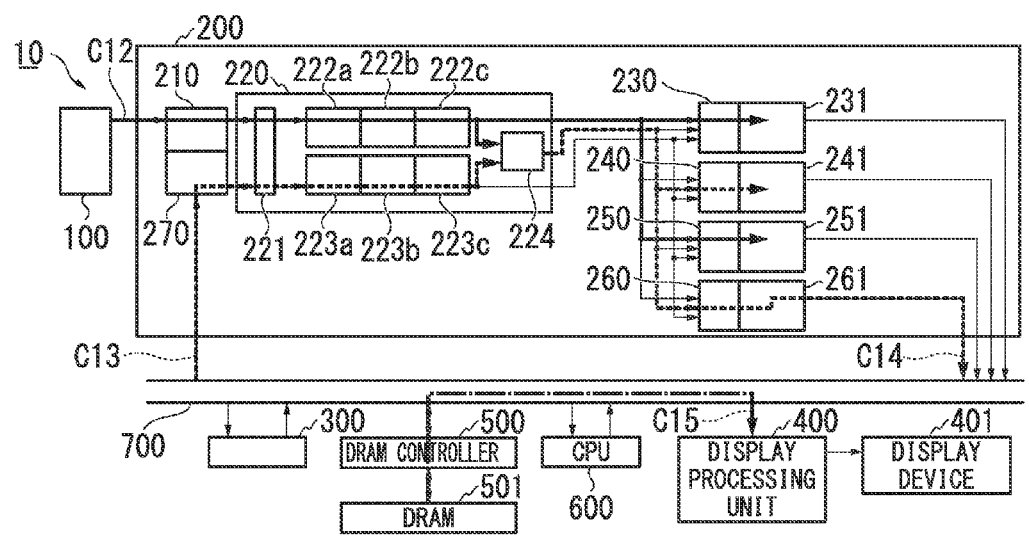
FIG. 2B is a diagram schematically illustrating an example of an evaluation value generating operation and an image display operation by the imaging device according to the first embodiment.

Next, an example of an operation of the imaging device 10 will be described. FIGS. 2A and 2B are diagrams schematically illustrating an example of an evaluation value generating operation and an image display operation by the imaging device 10 according to the first embodiment. The imaging device 10 causes the captured image according to the pixel signals output from the image sensor 100 to be sequentially displayed on the display device 401 while generating the AE evaluation value, the AWB evaluation value, and the AF evaluation value used to perform AE, AWB, and AF control related to capturing. FIGS. 2A and 2B illustrate a data path in an evaluation value generating operation and an image display operation in the block diagram of the imaging device 10 illustrated in FIG. 1.

A processing procedure of each of the evaluation value generating operation and the image display operation by the imaging device 10 will be described below in order.

(Process 1): First, in a process 1, the CPU 600 controls the selector 221, the selector 230, the selector 240, the selector 250, and the selector 260. For example, a path C11 illustrated in FIG. 2A is selected as a data path. Then, the imaging device 10 performs pre-processing on image data according to a pixel signal output from the image sensor 100. The imaging device 10 generates the evaluation value based on the pre-processed image data (the Bayer data) which has been subjected to pre-processing. The imaging device 10 stores the pre-processed image data (the Bayer data) in the DRAM 501 via the DRAM controller 500.

More specifically, the pixel signal output from the image sensor 100 is input to the imaging processing unit 200. The imaging IF unit 210 in the imaging processing unit 200 outputs the input pixel signal to the pre-processing unit 220 as image data. Then, the selector 221 in the pre-processing unit 220 transfers the image data input from the imaging IF unit 210 to the processing unit 222a. The processing units 222a to 222c perform sequential pre-processing (correction process) on the input image data.

The pre-processing unit 220 outputs the pre-processed image data which has been subjected to pre-processing (correction process) by the processing unit 222c to the selector 230, the selector 250, and the selector 260. Then, the selector 230, the selector 250, and the selector 260 output the pre-processed image data input from the pre-processing unit 220 to the AE evaluation value generating unit 231, the AF evaluation value generating unit 251, and the output DMA unit 261, respectively.

The AE evaluation value generating unit 231 and the AF evaluation value generating unit 251 store the AE evaluation value and the AF evaluation value, respectively, calculated (generated) based on the pre-processed image data input from the pre-processing unit 220 in the DRAM 501 via the DRAM controller 500. The output DMA unit 261 stores the pre-processed image data (the Bayer data) input from the pre-processing unit 220 in the DRAM 501 via the DRAM controller 500 as ancaptured image of a first frame.

(Process 2): Next, in a process 2, the CPU 600 controls the selector 221, the selector 230, the selector 240, the selector 250, and the selector 260. For example, a path C12, a path C13, and a path C14 illustrated in FIG. 2B are selected as a data path. Then, similarly to the process 1, the imaging device 10 performs pre-processing on the image data according to the pixel signal output from the image sensor 100, and generates the evaluation value based on the pre-processed image data (the Bayer data) which has been subjected to pre-processing.

Further, similarly, the imaging device 10 acquires (reads) the captured image of the first frame stored in the DRAM 501. The imaging device 10 synthesizes the image data of the acquired captured image of the first frame with the pre-processed image data (the Bayer data) which has been subjected to pre-processing. The imaging device 10 generates the evaluation value based on the synthesized image data (Bayer data). Further, the imaging device 10 stores the synthesized image data (the Bayer data) in the DRAM 501 via the DRAM controller 500.

More specifically, the pixel signal output from the image sensor 100 is input to the imaging processing unit 200. The imaging IF unit 210 in the imaging processing unit 200 outputs the input pixel signal to the pre-processing unit 220 as image data. Then, the selector 221 in the pre-processing unit 220 transfers the image data input from the imaging IF unit 210 to the processing unit 222a. The processing units 222a to 222c perform sequential pre-processing (correction process) on the input image data, and then output the resultant data to the synthesizing unit 224. The pre-processing unit 220 outputs the pre-processed image data which has been subjected to pre-processing (correction process) by the processing unit 222c to the AE evaluation value generating unit 231 and the AF evaluation value generating unit 251 via the selector 230 and the selector 250, respectively (see the path C12).

At the same time, the input DMA unit 270 in the imaging processing unit 200 acquires (reads) the captured image of the first frame stored in the DRAM 501 via the DRAM controller 500. The input DMA unit 270 outputs the image data of the acquired captured image of the first frame to the pre-processing unit 220. Then, the selector 221 in the pre-processing unit 220 transfers the image data of the captured image of the first frame input from the input DMA unit 270 to the delay unit 223a. The delay units 223a to 223c delay the input image data of the captured image of the first frame by a predetermined amount of time, and then output the delayed image data to the synthesizing unit 224 (see the path C13).

The synthesizing unit 224 generates synthesis image data in which the pre-processed image data that has been subjected to pre-processing (correction process) by the processing unit 222c, that is, an captured image of a second frame is synthesized with the delay image data delayed by the delay unit 223c, that is, the captured image of the first frame. The pre-processing unit 220 outputs the synthesis image data generated by the synthesizing unit 224 to the AWB evaluation value generating unit 241 and the output DMA unit 261 via the selector 240 and the selector 260, respectively. Then, the output DMA unit 261 stores the synthesis image data (the Bayer data) input from the pre-processing unit 220 in the DRAM 501 via the DRAM controller 500 (see the path C14).

The AE evaluation value generating unit 231 and the AF evaluation value generating unit 251 store the AE evaluation value and the AF evaluation value which are calculated (generated) based on the pre-processed image data (the captured image of the second frame) input from the pre-processing unit 220 in the DRAM 501 via the DRAM controller 500. The AWB evaluation value generating unit 241 calculates (generates) the AWB evaluation value based on the synthesis image data input from the pre-processing unit 220, and stores the generated AWB evaluation value in the DRAM 501 via the DRAM controller 500.

Thereafter, the imaging device 10 displays the display image corresponding to the synthesis image data (the Bayer data) stored in the DRAM 501 on the display device 401. At this time, for example, data is input to the display processing unit 400 via the path C15 illustrated in FIG. 2B.

More specifically, the display processing unit 400 acquires (reads) the synthesis image data stored in the DRAM 501 via the DRAM controller 500. The display processing unit 400 executes display processing on the acquired synthesis image data, and generates display image data (the display image). Then, the display processing unit 400 outputs the generated display image to the display device 401. As a result, the display image (the synthesis image data) is displayed on the display device 401.

Thereafter, the imaging device 10 repeats the process 1 and the process 2. In other words, in the process 1, calculation (generation) of the AE evaluation value and the AF evaluation value based on the captured image of the first frame (the pre-processed image data) and storage of the captured image of the first frame (the Bayer data) in the DRAM 501 are performed. In other words, in the process 2, calculation (generation) of the AE evaluation value and the AF evaluation value based on the captured image of the second frame (the pre-processed image data), generation of the synthesis image data, calculation (generation) of the AWB evaluation value based on the synthesis image data, and storage of the synthesis image data (the Bayer data) in the DRAM 501 are performed. The display processing unit 400 repeats generation of the display image and output of the display image to the display device 401 in the process 2.

As described above, in the imaging device 10, the CPU 600 selects a path of processing image data by each processing process by the selector 221, the selector 230, the selector 240, the selector 250, and the selector 260 as illustrated in FIGS. 2A and 2B. As a result, in the imaging device 10, capturing-related control (AE, AWB, and AF control) is performed based on the image data according to the pixel signal from the image sensor 100. Thus, the imaging device 10 is possible to sequentially display the display image according to the pixel signal from the image sensor 100 on the display device 401 while generating each of the evaluation values.

At this time, the display image to be displayed on the display device 401 is an image corresponding to the synthesis image data in which the captured image of the first frame is synthesized with the captured image of the second frame. Thus, a smooth moving image in which more evaluation values is possible to be obtained at the imaging frame rate and a subject to be captured is possible to be easily checked at the display frame rate is possible to be displayed even at the frame rate in which the frame rate (hereinafter referred to as an "imaging frame rate") of image data for acquiring the pixel signal from the image sensor 100 and generating the evaluation value is different from the frame rate (hereinafter referred to as a "display frame rate") for displaying the synthesis image data on the display device 401.

In the example of the evaluation value generating operation and the image display operation by the imaging device 10 illustrated in FIGS. 2A and 2B, the AWB evaluation value generating unit 241 does not generate the evaluation value in the process 1. However, each of the AE evaluation value generating unit 231, the AWB evaluation value generating unit 241, and the AF evaluation value generating unit 251 may perform an operation of generating the evaluation value in the process 1. In other words, the AE evaluation value, AWB evaluation value, and the AF evaluation value may be generated based on the captured image of the current frame which is the pre-processed image data according to the pixel signal from the image sensor 100, and the synthesis image data may be used as image data to be displayed on the display device 401.

Figure 3:
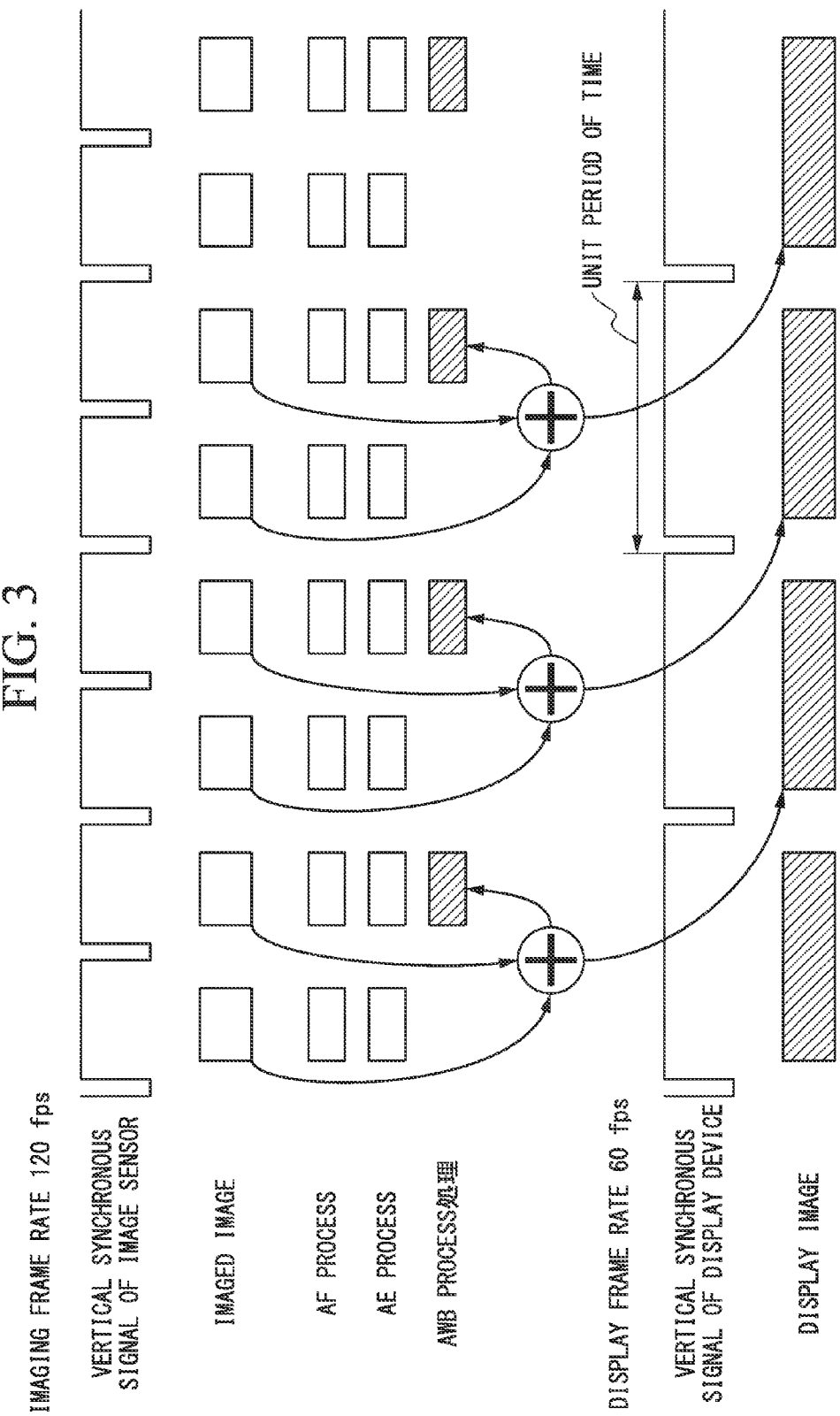
FIG. 3 is a timing chart illustrating an example of schematic timings of an image sensor and a display device included in the imaging device according to the first embodiment.
Figure 10:
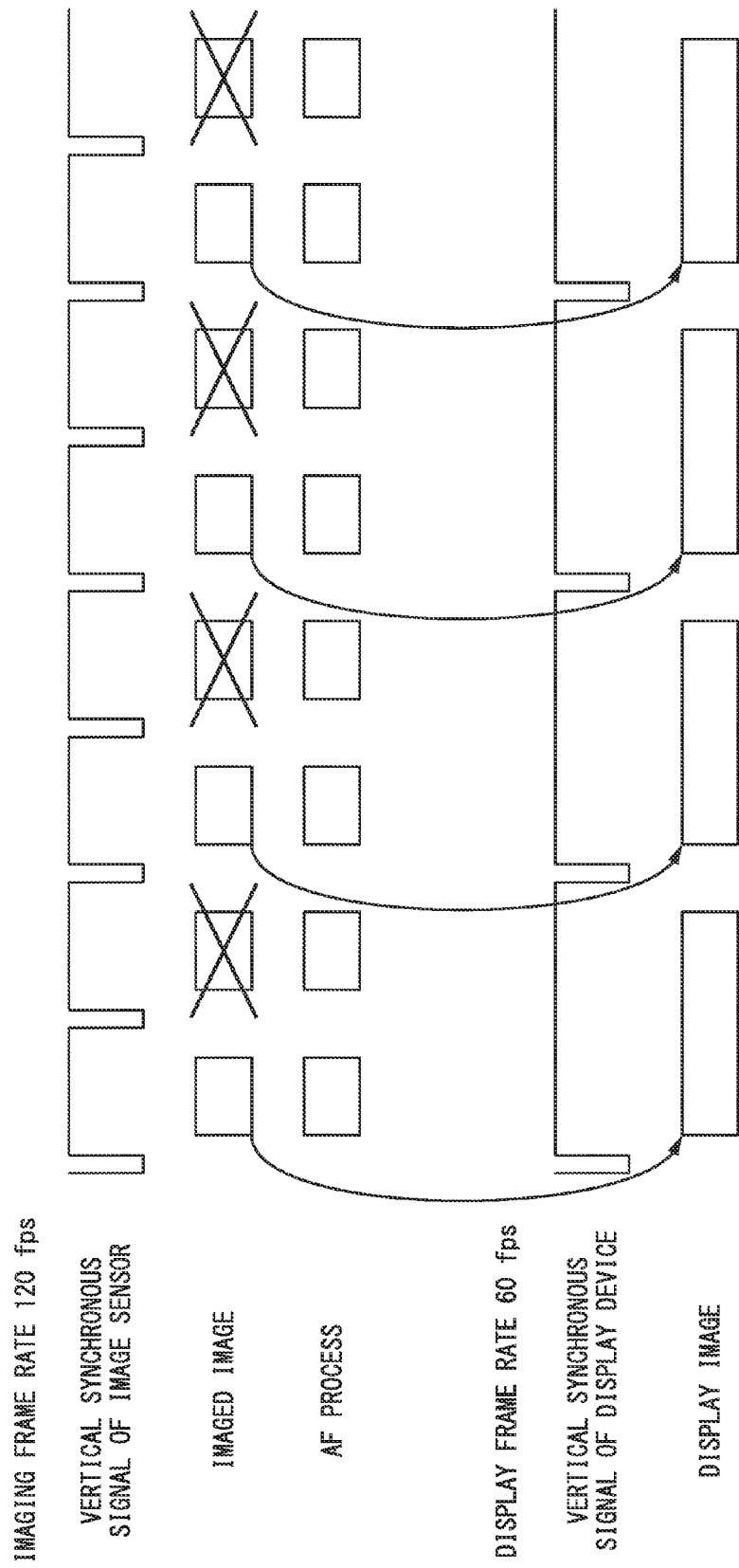
FIG. 10 is a timing chart illustrating an example of schematic timings of an image sensor and a display device included in the imaging device according to the conventional art.

Here, a timing relation in the example of the evaluation value generating operation and the image display operation by the imaging device 10 illustrated in FIGS. 2A and 2B will be described. FIG. 3 is a timing chart illustrating an example of schematic timings of the image sensor 100 and the display device 401 included in the imaging device 10 according to the first embodiment. In FIG. 3, similarly to a timing in the imaging device of the conventional art illustrated in FIG. 10, the imaging frame rate of the image sensor 100 is 120 fps (frame/second). FIG. 3 illustrates a timing relation between the captured image as the image data according to the pixel signal acquired from the image sensor 100 and the display image as the image data to be displayed on the display device 401 when the display frame rate of the display device 401 is 60 fps.

In FIG. 3, a "vertical synchronous signal of an image sensor" refers to a signal representing a start timing at which the pixel signal of each frame is acquired from the image sensor 100. A "vertical synchronous signal of a display device" refers to a signal representing a timing at which the display device 401 starts to display an image of each frame. The display device 401 updates the display image to display each time the "vertical synchronous signal of the display device" is input (in unit periods of time illustrated in FIG. 3). In FIG. 3, periods of time of the "AF process," the "AE process," and the "AWB process" are periods of time in which the AE evaluation value generating unit 231, the AF evaluation value generating unit 251, and the AWB evaluation value generating unit 241 generate the AE evaluation value, the AF evaluation value, and AWB evaluation value, respectively, based on the captured image. FIG. 3 illustrates a case in which a timing of the "vertical synchronous signal of image sensor" is synchronized with a timing of the "vertical synchronous signal of display device" for the sake of a simple comparison of a timing relation between the captured image and the display image.

The synthesizing unit 224 included in the imaging device 10 generates synthesis image data in which an captured image of an odd-numbered frame is synchronized with synthesis image data of an even-numbered frame by the process 2 as illustrated in FIG. 3. Then, the generated synthesis image data is displayed on the display device 401 as the display image. As described above, in the imaging device 10, an image is possible to be displayed on the display device 401 at the display frame rate (60 fps) without thinning out the captured image of each frame obtained from the image sensor 100, that is, without reducing information of an image. As a result, the imaging device 10 is possible to display an excellent display image to be displayed on the display device 401.

Further, as illustrated in FIG. 3, the AE evaluation value generating unit 231 and the AF evaluation value generating unit 251 included in the imaging device 10 generate the AE evaluation value and the AF evaluation value, respectively, based on the captured image (the pre-processed image data) of each frame by the process 1 and the process 2. In other words, each evaluation value is generated at the imaging frame rate (120 fps). As a result, the imaging device 10 Is possible to obtain more AE evaluation values and AF evaluation values. Accordingly, in the imaging device 10, for example, it is possible to implement an increase in the speed of the AF function, that is, an increase in the focusing speed.

Further, as illustrated in FIG. 3, the AWB evaluation value generating unit 241 included in the imaging device 10 generates the AWB evaluation value based on the synthesis image data by the process 2. In other words, the AWB evaluation value generating unit 241 generates the evaluation value at the display frame rate (60 fps). Thus, the imaging device 10 is possible to obtain the same AWB evaluation value as in the imaging device according to the conventional art.

As described above, the imaging device 10 according to the first embodiment generates the evaluation value at the imaging frame rate of the pixel signal output from the image sensor 100. Thus, the imaging device 10 according to the first embodiment is possible to obtain more evaluation values by increasing the imaging frame rate of the image sensor 100. Accordingly, in the imaging device 10 according to the first embodiment, the speed of capturing-related control in the imaging device 10 is possible to be increased.

Further, the imaging device 10 according to the first embodiment synthesizes the image data (the captured image of the current frame) according to the pixel signal output from the image sensor 100 with the image data (the captured image of the previous frame) acquired (read) via the DRAM controller 500. In other words, the image data according to the pixel signal output from the image sensor 100 is synthesized in units of frames. For this reason, in the imaging device 10 according to the first embodiment, the imaging frame rate of the image sensor 100 may be different from the display frame rate of the display device 401. In this case, the imaging device 10 according to the first embodiment absorbs a difference in the frame rate without thinning out a frame of an captured image acquired from the image sensor 100, that is, without reducing information of an image, and thus the excellent display image is possible to be displayed on the display device 401.

In the imaging device 10 according to the first embodiment, the example of the evaluation value generating operation and the image display operation illustrated in FIGS. 2A and 2B and the example of the schematic timings of the image sensor 100 and the display device 401 illustrated in FIG. 3 are considered. The description has been made in connection with the example in which the imaging frame rate is 120 fps and the display frame rate is 60 fps as an example. However, neither the imaging frame rate nor the display frame rate is limited to the example of the first embodiment. For example, a similar application is possible to be made even when the imaging frame rate is 240 fps and the display frame rate is 60 fps. In this case, the synthesizing unit 224 synthesizes image data of the captured image corresponding to four frames as the synthesis image data. Then, in the imaging device 10, subsequently to the process 1, storage of the synthesis image data (the Bayer data) in the DRAM 501 in the process 2 is repeated three times, that is, the synthesis process of the captured image corresponding to four frames ends, and then the display processing unit 400 repeats an operation of generating the display image and outputting the generated display image to the display device 401 in the process 2.

Further, in the imaging device 10 according to the first embodiment, the example of the evaluation value generating operation and the image display operation illustrated in FIGS. 2A and 2B and the example of the schematic timings of the image sensor 100 and the display device 401 illustrated in FIG. 3 are considered. The description has been made in connection with the example in which the AE process and the AF process are performed at the imaging frame rate (120 fps) and the AWB process is performed at the display frame rate (60 fps) as an example. However, timings at which the AE process, the AWB process, and the AF process are performed are not limited to the timings according to the first embodiment. In other words, in the imaging device 10 according to the first embodiment, the selector 230, the selector 240, and the selector 250 are arranged at the stage before the AE evaluation value generating unit 231, the AWB evaluation value generating unit 241, and the AF evaluation value generating unit 251. For this reason, each evaluation value generating unit is possible to perform the evaluation value generating process at any of the imaging frame rate (120 fps) and the display frame rate (60 fps).

In addition, in the imaging device 10 according to the first embodiment, the synthesizing unit 224 is possible to synthesize image data of an captured image of each frame output from the image sensor 100 at the high imaging frame rate in units of frames as described above. For this reason, in the imaging device 10, in the process 2, the image data of the previous frame which is acquired (read) and then stored in the DRAM 501 by the input DMA unit 270, the synthesis image data stored in the DRAM 501 via the output DMA unit 261, and the synthesis image data which is acquired (read) and then stored in the DRAM 501 via the display processing unit 400 for a display on the display device 401 are exchanged with those in the DRAM 501 via the DRAM controller 500. In other words, the respective image data is present on the data bus 700 at the same time. When a lot of image data is present on the data bus 700 at the same time, a bus band of the data bus 700 is compressed. In an actual operation of the imaging device 10, the bus band of the data bus 700 needs to be considered.

Figure 4A:
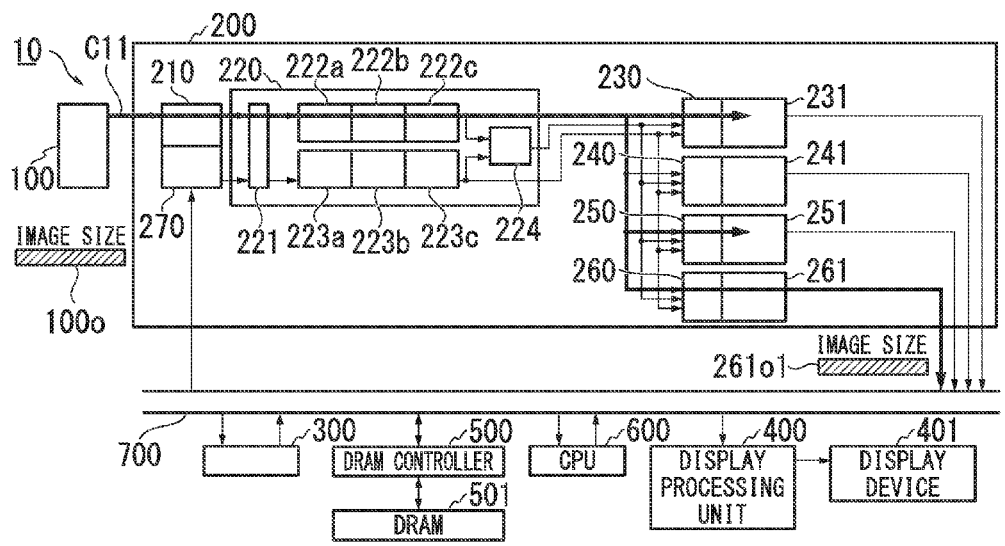
FIG. 4A is a diagram schematically illustrating an example of a bus band when an image is displayed on the imaging device according to the first embodiment.
Figure 4B:
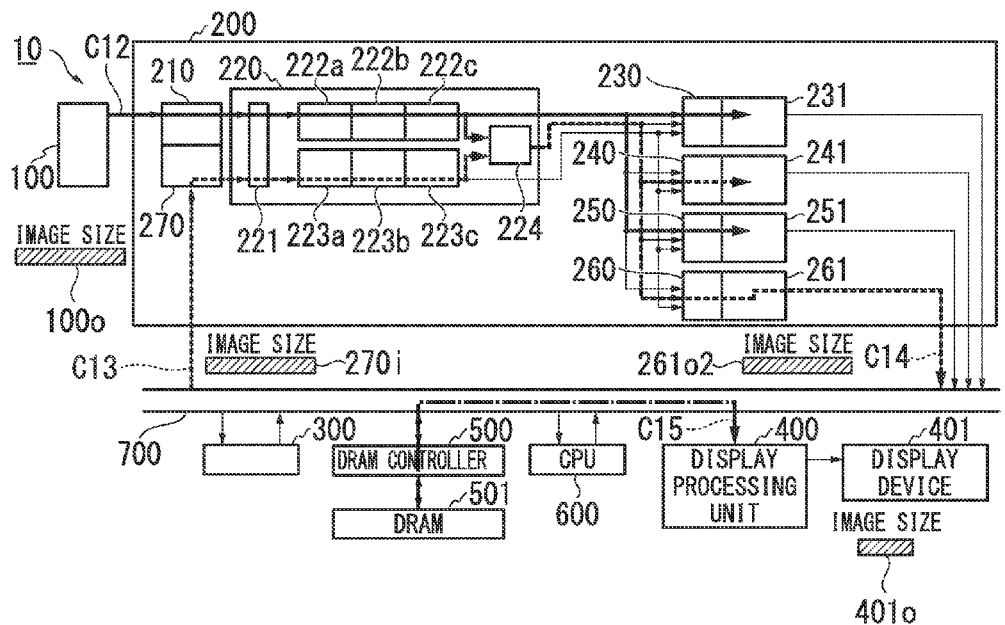
FIG. 4B is a diagram schematically illustrating an example of a bus band when an image is displayed on the imaging device according to the first embodiment.

Here, the bus band of the data bus 700 in the imaging device 10 will be described. FIGS. 4A and 4B are diagrams schematically illustrating an example of a bus band when an image is displayed on the imaging device 10 according to the first embodiment. FIGS. 4A and 4B schematically illustrate the size of image data exchanged via each data path in addition to the example of the evaluation value generating operation and the image display operation illustrated in FIGS. 2A and 2B. The bus band of the data bus 700 will be described in connection with the size of image data exchanged on the data bus 700 at the same time. An image according to the pixel signal of the image sensor 100 is assumed to have an image size 100*o* illustrated in FIGS. 4A and 4B.

First, in the process 1, a pixel signal with the image size 100*o* is output from the image sensor 100. An captured image with an image size 261*o*1 (=the image size 100*o*), illustrated in FIG. 4A processed by the imaging processing unit 200 is stored in the DRAM 501 by the output DMA unit 261 as the captured image of the first frame.

Next, in the process 2, the pixel signal with the image size 100*o* is output from the image sensor 100 and then input to the imaging processing unit 200. Further, in the process 2, the captured image of the first frame with an image size 270*i* (=the image size 261*o*1), illustrated in FIG. 4B stored in the DRAM 501 is acquired (read) by the input DMA unit 270 and then synthesized by the synthesizing unit 224. Then, the synthesis image data with an image size 261*o*2 (=the image size 261*o*1) illustrated in FIG. 4B is stored in the DRAM 501 by the output DMA unit 261.

Thereafter, in the process 2, the synthesis image data with the image size 261*o*2 (=the image size 261*o*1) stored in the DRAM 501 is acquired (read) by the display processing unit 400. Then, the display processing unit 400 executes display processing such as resizing (reduction) on the acquired (read) synthesis image data with the image size 261*o*2 (=the image size 261*o*1), and generates the display image with an image size 401*o* (<the image size 261*o*2) illustrated in FIG. 4B.

As described above, when the captured image according to the pixel signal input from the image sensor 100 is sequentially displayed on the display device 401, particularly, the input DMA unit 270 acquires (reads) the captured image of the first frame stored in the DRAM 501. The bus band of the data bus 700 is compressed in the imaging device 10 when the output DMA unit 261 stores the synthesis image data in the DRAM 501. This is because the image data of the captured image corresponding to two frames accessed by the input DMA unit 270 and the output DMA unit 261 are simultaneously present on the data bus 700.

However, as illustrated in FIGS. 4A and 4B, the size of the display image that is possible to be displayed on the display device 401 is much smaller than the size of the captured image according to the pixel signal output from the image sensor 100. Thus, the size of image data with which the display processing unit 400 generates the display image is the size of image data smaller than the size of the captured image according to the pixel signal output from the image sensor 100 and is thus sufficient. The difference between the size of the captured image and the size of the display image becomes more remarkable as the number of pixels of the image sensor 100 increases. For this reason, as the sizes of images simultaneously present on the data bus 700 are appropriately adjusted, compression of the bus band of the data bus 700 is possible to be considered to be alleviated. The alleviation of the compression of the bus band of the data bus 700 is useful in terms of alleviation of the load of display processing on the display processing unit 400.

Further, in the imaging device 10, the synthesizing unit 224 synthesizes the image data of the captured image of the current frame output from the image sensor 100 at the high imaging frame rate with the image data of the captured image of the previous frame input from the input DMA unit 270 in units of frames. For this reason, a load of the synthesis process by the synthesizing unit 224 is large. For this reason, it is desirable to alleviate the load of the synthesis process on the synthesizing unit 224.

Furthermore, in the imaging device 10, the captured image according to the pixel signal input from the image sensor 100 is sequentially displayed on the display device 401, but the image processing unit 300 may perform various kinds of image processing on the synthesis image data. For this reason, it is necessary to alleviate a processing load by the image processing unit 300, and the alleviation of the compression of the bus band of the data bus 700 is useful in terms of a comfortable operation of the imaging device 10.

<Second Embodiment>

Figure 5:
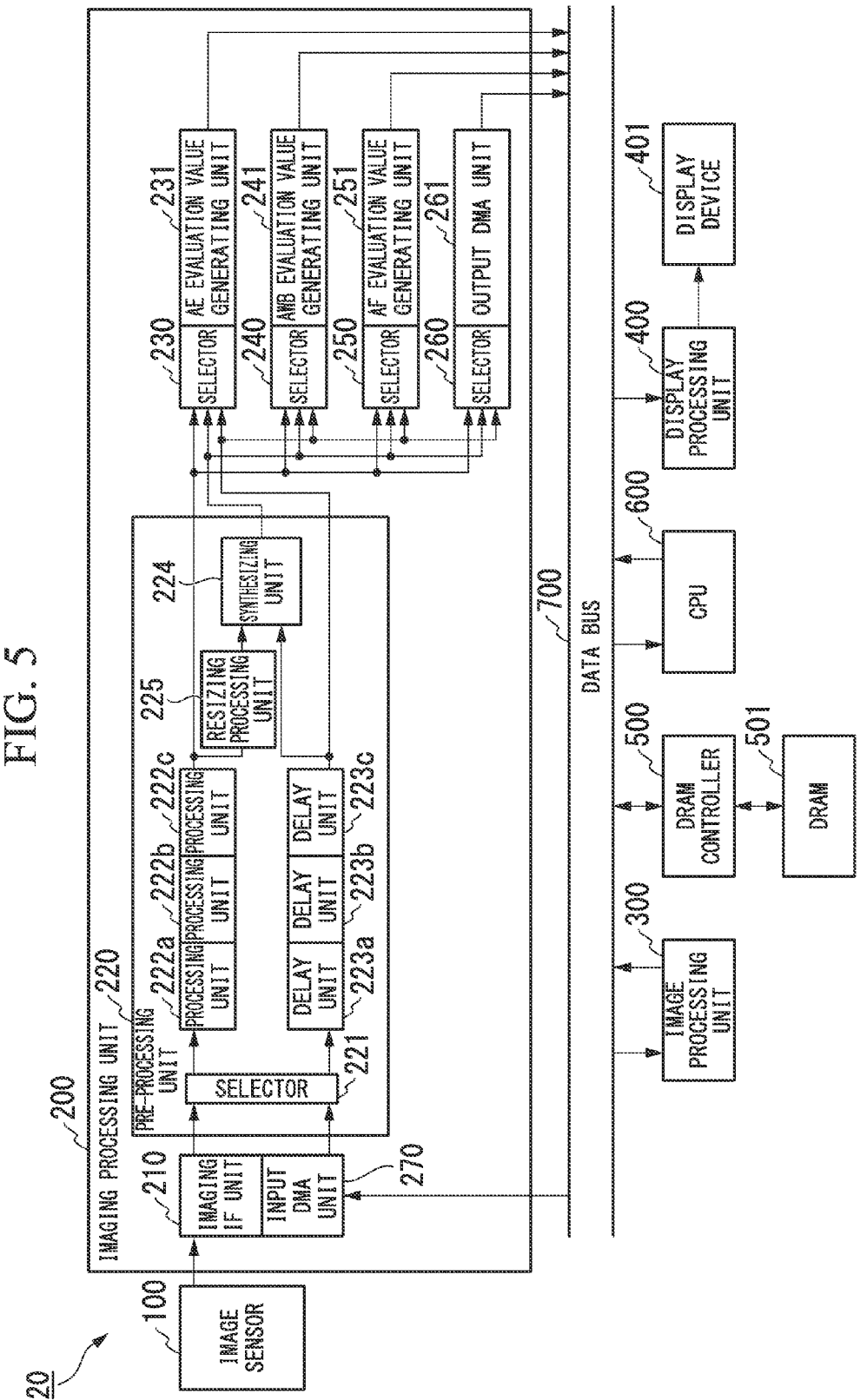
FIG. 5 is a block diagram illustrating a schematic configuration of an imaging device according to a second embodiment of the present invention.

Next, an imaging device according to a second embodiment of the present invention will be described. FIG. 5 is a block diagram illustrating a schematic configuration of the imaging device according to the second embodiment. An imaging device 20 according to the second embodiment is different from the imaging device 10 according to the first embodiment illustrated in FIG. 1 in that in the pre-processing unit 220 included in the imaging processing unit 200, a resizing processing unit 225 is added between the processing unit 222*c* and the synthesizing unit 224. The remaining components are the same as in the imaging device 10 according to the first embodiment. Thus, the imaging device 20 according to the second embodiment will be described focusing on the configuration and the operation which are different from those of the imaging device 10 according to the first embodiment illustrated in FIG. 1, and thus a detailed description thereof will not be provided here. In the following description, the same components of the imaging device 20 according to the second embodiment as in the imaging device 10 according to the first embodiment illustrated in FIG. 1 are denoted by the same reference numerals.

The resizing processing unit 225 resizes (reduces) the pre-processed image data input from the processing unit 222*c* to, for example, a predetermined image size which is possible to be displayed on the display device 401. Then, the resizing processing unit 225 outputs the resized (reduced) pre-processed image data to the synthesizing unit 224 as the pre-processed image data of the resized current frame (hereinafter referred to as "pre-processed resized image data"). A method of the resizing (reducing) process by the resizing processing unit 225 is the same as a method of the resizing (reducing) process performed, for example, by the display processing unit 400, and thus a detailed description thereof will not be provided here.

The resizing processing unit 225 has a function of deciding whether or not to execute the resizing (reducing) process on the pre-processed image data input from the processing unit 222*c*, that is, a function of turning on or off the resizing (reducing) process. The switching between on and off of the resizing (reducing) process by the resizing processing unit 225 is controlled by the CPU 600 in each process of the evaluation value generating operation and the image display operation in the imaging device 20.

The synthesizing unit 224 generates synthesis image data in which the input pre-processed resized image data is synthesized with the delay image data, that is, synthesis image data which has been subjected to the resizing (reducing) process, and outputs the generated synthesis image data to the selector 230, the selector 240, the selector 250, and the selector 260. In the imaging device 20 according to the second embodiment, the synthesizing unit 224 also has a function of deciding whether or not to execute the synthesis process, that is, a function of turning on or off the synthesis process. The switching between on and off of the synthesis process by the synthesizing unit 224 is controlled by the CPU 600 in each process of the evaluation value generating operation and the image display operation in the imaging device 20.

The synthesis image data which has been subjected to the resizing (reducing) process is stored in the DRAM 501 via the DRAM controller 500 by the output DMA unit 261. Then, the display processing unit 400 acquires (reads) the synthesis image data, which has been subjected to the resizing (reducing) process, stored in the DRAM 501. The display processing unit 400 generates display image data (hereinafter referred to as a "display image") by executing display processing such as display image processing or the process of superimposing OSD display data other than the resizing (reducing) process on the acquired synthesis image data. Then, the display processing unit 400 outputs the generated display image data (the display image) to the display device 401 or an external display (not shown).

The display processing unit 400 may be configured to execute only display processing such as the process of superimposing the OSD display data. In this case, for example, the image processing unit 300 generates display image data by executing display image processing other than the resizing (reducing) process on the synthesis image data, which has been subjected to the resizing (reducing) process, acquired from the DRAM 501. The display processing unit 400 stores (writes) the generated display image data in the DRAM 501 again. Then, the display processing unit 400 acquires (reads) the display image data stored in the DRAM 501, and executes display processing such as the process of superimposing OSD display data on the acquired display image data.

Figure 6A:
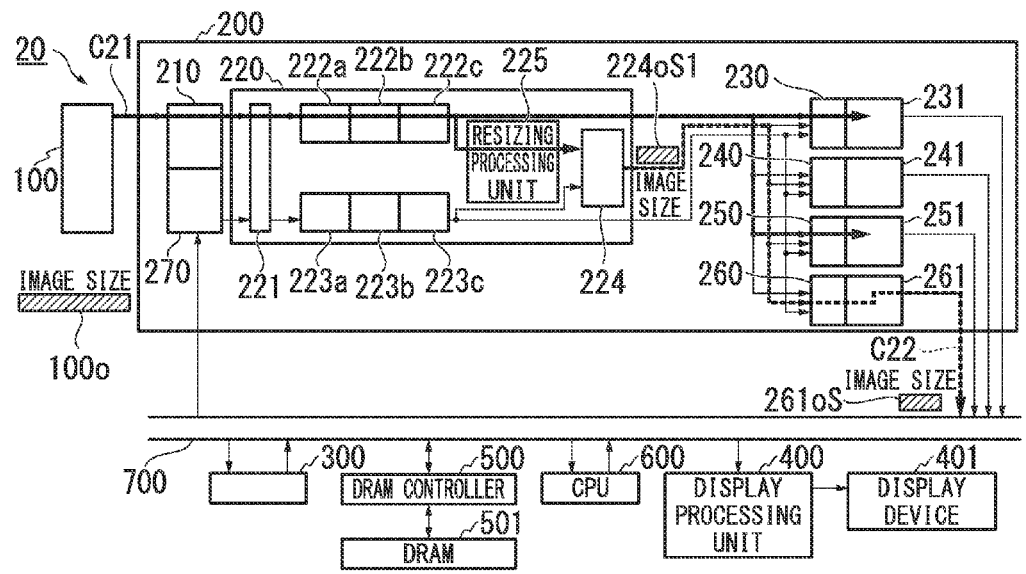
FIG. 6A is a diagram schematically illustrating an example of an evaluation value generating operation, an image display operation, and the size of image data by the imaging device according to the second embodiment.
Figure 6B:
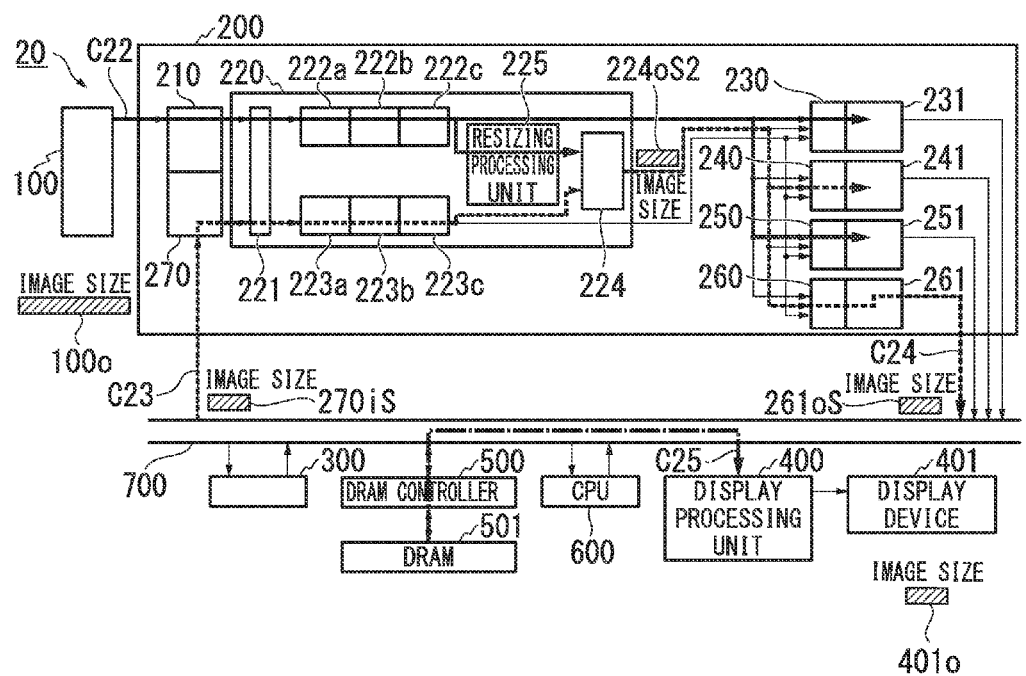
FIG. 6B is a diagram schematically illustrating an example of an evaluation value generating operation, an image display operation, and the size of image data by the imaging device according to the second embodiment.

Next, an example of an operation of the imaging device 20 according to the present embodiment will be described. FIGS. 6A and 6B are diagrams schematically illustrating an example of an evaluation value generating operation, an image display operation, and the size of image data by the imaging device 10 according to the second embodiment. Similarly to the imaging device 10 according to the first embodiment, the imaging device 20 sequentially displays the captured image according to the pixel signals output from the image sensor 100 on the display device 401 at the display frame rate while generating the AE evaluation value, the AWB evaluation value, and the AF evaluation value used to perform AE, AWB, and AF control related to capturing.

FIGS. 6A and 6B illustrate a data path in an evaluation value generating operation and an image display operation in the block diagram of the imaging device 20 illustrated in FIG. 5. Further, FIGS. 6A and 6B additionally illustrates a diagram schematically illustrating the size of image data exchanged by each data path. In the following description, the processing procedure of each of the evaluation value generating operation and the image display operation by the imaging device 20 will be described in order, and the bus band of the data bus 700 will be described in connection with the size of image data simultaneously exchanged on the data bus 700. Further, in the following description, the image size according to the pixel signal of the image sensor 100 is assumed to be the same size as the image size 100o in the imaging device 10 according to the first embodiment illustrated in FIGS. 4A and 4B.

A timing relation between the image sensor 100 and the display device 401 in the example of the evaluation value generating operation and the image display operation by the imaging device 20 illustrated in FIGS. 6A and 6B is the same as a timing relation between the image sensor 100 and the display device 401 in the imaging device 10 according to the first embodiment illustrated in FIG. 3, and thus a detailed description thereof will not be provided here.

(Process 1): First, in a process 1, the CPU 600 controls the selector 221, the selector 230, the selector 240, the selector 250, and the selector 260. For example, a path C21 and a path C22 illustrated in FIG. 6A are selected as data paths.

In the process 1, the CPU 600 turns on the resizing (reducing) process of the resizing processing unit 225, and turns off the synthesis process of the synthesizing unit 224. Then, the imaging device 20 performs pre-processing on the image data according to the pixel signal output from the image sensor 100. The imaging device 20 generates the evaluation value based on the pre-processed image data (the Bayer data) which has been subjected to pre-processing. Further, the imaging device 20 resizes (reduces) the pre-processed image data (the Bayer data), and stores the resized (reduced) pre-processed resized image data in the DRAM 501 via the DRAM controller 500.

More specifically, the pixel signal with the image size 100o output from the image sensor 100 is input to the imaging processing unit 200, and the imaging IF unit 210 in the imaging processing unit 200 outputs the input pixel signal to the pre-processing unit 220 as image data. Then, the selector 221 in the pre-processing unit 220 transfers the image data input from the imaging IF unit 210 to the processing unit 222a. The processing units 222a to 222c execute sequential pre-processing (correction process) on the input image data. The pre-processing unit 220 outputs the pre-processed image data which has been subjected to pre-processing (correction process) by the processing unit 222c to the AE evaluation value generating unit 231 and the AF evaluation value generating unit 251 via the selector 230 and the selector 250, respectively (see the path C21).

The resizing processing unit 225 in the pre-processing unit 220 executes the resizing (reducing) process on the pre-processed image data which has been subjected to pre-processing (correction process) by the processing unit 222c, and outputs the pre-processed resized image data which has been subjected to the resizing (reducing) process to the selector 260 via the synthesizing unit 224.

Here, the synthesizing unit 224 in the pre-processing unit 220 outputs the pre-processed resized image data with an image size 224oS1 (<the image size 100o) illustrated in FIG. 6A to the selector 260. Then, the selector 260 outputs the pre-processed resized image data input from the pre-processing unit 220 to the corresponding output DMA unit 261 (see the path C22).

The AE evaluation value generating unit 231 and the AF evaluation value generating unit 251 store the AE evaluation value and the AF evaluation value calculated (generated) based on the pre-processed image data input from the pre-processing unit 220 in the DRAM 501 via the DRAM controller 500. At the same time, the output DMA unit 261 stores the pre-processed resized image data input from the pre-processing unit 220 (the Bayer data) in the DRAM 501 via the DRAM controller 500 as the captured image of the first frame. Here, the output DMA unit 261 stores the captured image (the pre-processed resized image data) with an image size 261oS (=the image size 224oS1) illustrated in FIG. 6A in the DRAM 501 as the captured image of the first frame.

(Process 2): Next, in a process 2, the CPU 600 controls the selector 221, the selector 230, the selector 240, the selector 250, and the selector 260. For example, a path C23, a path C24, and a path C25 illustrated in FIG. 6B are selected as data paths. In the process 2, the CPU 600 turns on the resizing (reducing) process of the resizing processing unit 225, and turns on the synthesis process of the synthesizing unit 224.

Then, similarly to the process 1, the imaging device 20 performs pre-processing on the image data according to the pixel signal output from the image sensor 100, and generates the evaluation value based on the pre-processed image data (the Bayer data) which has been subjected to pre-processing. The imaging device 20 resizes (reduces) the pre-processed image data (the Bayer data).

At the same time, the imaging device 20 acquires (reads) the captured image of the first frame stored in the DRAM 501. The imaging device 20 synthesizes the acquired image data of the captured image of the first frame with the pre-processed resized image data (the Bayer data) in which the resizing (reducing) process is performed on the pre-processed image data, and generates the evaluation value based on the synthesized image data (the Bayer data). Further, the imaging device 20 stores the synthesized image data (the Bayer data) in the DRAM 501 via the DRAM controller 500.

More specifically, the pixel signal with the image size 100o output from the image sensor 100 is input to the imaging processing unit 200. The imaging IF unit 210 in the imaging processing unit 200 outputs the input pixel signal to the pre-processing unit 220 as image data. Then, the selector 221 in the pre-processing unit 220 transfers the image data input from the imaging IF unit 210 to the processing unit 222a. The processing units 222a to 222c execute sequential pre-processing (a correction process) on the input image data. The pre-processing unit 220 outputs the pre-processed image data which has been subjected to pre-processing (a correction process) by the processing unit 222c to the AE evaluation value generating unit 231 and the AF evaluation value generating unit 251 via the selector 230 and the selector 250, respectively. The resizing processing unit 225 in the pre-processing unit 220 executes the resizing (reducing) process on the pre-processed image data which has been subjected to pre-processing (a correction process) by the processing unit 222c. The resizing processing unit 225 outputs the pre-processed resized image data which has been subjected to the resizing (reducing) process to the synthesizing unit 224 (see the path C23).

At the same time, the input DMA unit 270 in the imaging processing unit 200 acquires (reads) the captured image of the first frame with the image size 270iS (=the image size 261oS), illustrated in FIG. 6B, stored in the DRAM 501 via the DRAM controller 500. The input DMA unit 270 outputs the acquired image data of the captured image of the first frame to the pre-processing unit 220.

Then, the selector 221 in the pre-processing unit 220 transfers the image data of the captured image of the first frame input from the input DMA unit 270 to the delay unit 223a. The delay units 223a to 223c delay the input image data of the captured image of the first frame by a predetermined amount of time, and output the delayed data to the synthesizing unit 224 (see the path C24).

Then, the synthesizing unit 224 generates synthesis image data with an image size 224oS2 (=the image size 224oS1) illustrated in FIG. 6B in which the pre-processed resized image data that has been subjected to the pre-processing (correction process) by the processing unit 222c and the resizing (reducing) process by the resizing processing unit 225, that is, the captured image of the second frame is synthesized with the delay image data delayed by the delay unit 223c, that is, the captured image of the first frame. Then, the pre-processing unit 220 outputs the synthesis image data generated by the synthesizing unit 224 to the AWB evaluation value generating unit 241 and the output DMA unit 261 via the selector 240 and the selector 260, respectively. Then, the output DMA unit 261 stores the synthesis image data (the Bayer data), which has been subjected to the resizing (reducing) process, input from the pre-processing unit 220 in the DRAM 501 via the DRAM controller 500 (see the path C25). Here, the output DMA unit 261 stores the captured image (the synthesis image data which has been subjected to the resizing (reducing) process) with the image size 261oS (=the image size 224oS2) illustrated in FIG. 6B in the DRAM 501.

The AE evaluation value generating unit 231 and the AF evaluation value generating unit 251 store the AE evaluation value and the AF evaluation value calculated (generated) based on the pre-processed image data input from the pre-processing unit 220 in the DRAM 501 via the DRAM controller 500. The AWB evaluation value generating unit 241 calculates (generates) the AWB evaluation value based on the synthesis image data input from the pre-processing unit 220. The AWB evaluation value generating unit 241 stores the generated AWB evaluation value in the DRAM 501 via the DRAM controller 500.

Thereafter, the imaging device 20 causes the display image corresponding to the synthesis image data (the Bayer data), which has been subjected to the resizing (reducing) process, stored in the DRAM 501 to be displayed on the display device 401. At this time, for example, data is input to the display processing unit 400 via the path C26 illustrated in FIG. 6B.

More specifically, the display processing unit 400 acquires (reads) the synthesis image data with the image size 261oS (=the image size 224oS2) stored in the DRAM 501 via the DRAM controller 500. The display processing unit 400 generates display image data (the display image) by executing display processing other than the resizing (reducing) process on the acquired synthesis image data. Then, the display processing unit 400 outputs the generated display image to the display device 401. As a result, the display image corresponding to the synthesis image data which has been subjected to the resizing (reducing) process by the resizing processing unit 225 is displayed on the display device 401.

Thereafter, the imaging device 20 repeats calculation (generation) of the AE evaluation value and the AF evaluation value based on the pre-processed image data and storage of the captured image of the first frame (the Bayer data) in the DRAM 501 in the process 1, and calculation (generation) of the AE evaluation value and the AF evaluation value based on the pre-processed image data, generation of the synthesis image data which has been subjected to the resizing (reducing) process, calculation (generation) of the AWB evaluation value based on the synthesis image data, and storage of the synthesis image data (the Bayer data) in the DRAM 501 in the process 2. Further, the display processing unit 400 repeats generation of the display image corresponding to the synthesis image data (the Bayer data) which has been subjected to the resizing (reducing) process and output of the display image to the display device 401 in the process 2.

As described above, in the imaging device 20, the CPU 600 selects a path of processing image data by each processing procedure via the selector 221, the selector 230, the selector 240, the selector 250, and the selector 260 as illustrated in FIGS. 6A and 6B. Further, the CPU 600 performs control such that the resizing (reducing) process by the resizing processing unit 225 is turned on or off, and the synthesis process by the synthesizing unit 224 is turned on or off. Thus, in the imaging device 20, capturing-related control (AE, AWB, and AF control) is performed based on the image data according to the pixel signal from the image sensor 100. Accordingly, the display image according to the pixel signal from the image sensor 100 is possible to be sequentially displayed on the display device 401 at the display frame rate while generating the evaluation values.

At this time, the display image to be displayed on the display device 401 is an image corresponding to the synthesis image data in which the captured image of the first frame is synthesized with the captured image of the second frame. For this reason, even at the frame rate in which the imaging frame rate for acquiring the pixel signal from the image sensor 100 and generating the evaluation value is different from the display frame rate for displaying the synthesis image data on the display device 401, more evaluation values are possible to be obtained at the imaging frame rate. Further, the synthesis image data for displaying the display image is the synthesis image data which has been subjected to the resizing (reducing) process. For this reason, in the imaging device 20, the compression of the bus band of the data bus 700 is possible to be alleviated. Further, a processing load occurring when the display processing unit 400 generates the display image is possible to be reduced.

Further, the synthesizing unit 224 synthesizes image data which has been subjected to the resizing (reducing) process, and generates the synthesis image data. In other words, the synthesizing unit 224 executes the synthesis process on small image data. For this reason, in the synthesizing unit 224, all image data on which the synthesis process is to be executed may be input at the high imaging frame rate. In this case, the synthesizing unit 224 is possible to perform the synthesis process in a state in which a load is reduced without increasing the processing load.

The example of the evaluation value generating operation and the image display operation by the imaging device 20 illustrated in FIGS. 6A and 6B has been described in connection with the case in which the synthesizing unit 224 synthesizes the image data of the captured image corresponding to two frames as the synthesis image data. However, image data of the captured image of more frames is possible to be synthesized according to the imaging frame rate and the display frame rate.

For example, when the display image corresponding to synthesis image data in which image data of the captured image corresponding to three frames is synthesized is displayed on the display device 401, the process 2 is repeated again. Thereafter, the display processing unit 400 may cause the display image corresponding to the synthesis image data (the Bayer data), which has been subjected to the resizing (reducing) process, stored in the DRAM 501 to be displayed on the display device 401. Thus, a display image to be displayed on the display device 401 becomes an image corresponding to synthesis image data in which an captured image of all frames (for example, 3 frames) which are included in the display frame rate and acquired at the imaging frame rate are synthesized.

The example of the evaluation value generating operation and the image display operation by the imaging device 20 illustrated in FIGS. 6A and 6B has been described in connection with the case in which the AWB evaluation value generating unit 241 does not generate the evaluation value in the process 1. However, in the process 1, each of the AE evaluation value generating unit 231, the AWB evaluation value generating unit 241, and the AF evaluation value generating unit 251 may operate to generate the evaluation value. In other words, the AE evaluation value, AWB evaluation value, and the AF evaluation value may be generated based on the captured image of the current frame which is the pre-processed image data according to the pixel signal from the image sensor 100, and the synthesis image data may be used as image data to be used on the display device 401. As a result, instead of the synthesis image data, the captured image according to the pixel signal input from the image sensor 100, that is, image data that has not been subjected to the resizing (reducing) process, is possible to be input directly to the AE evaluation value generating unit 231, the AWB evaluation value generating unit 241, and the AF evaluation value generating unit 251 so that the respective evaluation values are possible to be generated. Thus, the evaluation value generating process may be performed to generate the evaluation value having the low accuracy from the image data that has been subjected to the resizing (reducing) process, but since the image data that has not been subjected to the resizing (reducing) process is input directly to the respective evaluation value generating units, the evaluation value having the high accuracy is possible to be generated.

As described above, in the imaging device 20 according to the second embodiment, the evaluation value is possible to be generated at the imaging frame rate of the pixel signal output from the image sensor 100, similarly to the imaging device 10 according to the first embodiment. Thus, in the imaging device 20 according to the second embodiment, similarly to the imaging device 10 according to the first embodiment, as the imaging frame rate of the image sensor 100 increases, more evaluation values are possible to be obtained, and the speed of capturing-related control in the imaging device 20 is possible to be increased.

Further, in the imaging device 20 according to the second embodiment, similarly to the imaging device 10 according to the first embodiment, the image data according to the pixel signal output from the image sensor 100 is synthesized in units of frames. As a result, in the imaging device 20 according to the second embodiment, similarly to the imaging device 10 according to the first embodiment, the imaging frame rate of the image sensor 100 may be different from the display frame rate of the display device 401. In this case, the imaging device 20 according to the second embodiment is possible to display the excellent display image on the display device 401 without thinning out the frames of the captured image acquired from the image sensor 100.

Further, in the imaging device 20 according to the second embodiment, the display processing unit 400 performs the resizing (reducing) process on the image data used to generate the display image in advance. The image data which has been subjected to the resizing (reducing) process is stored in the DRAM 501. Thus, in the imaging device 20 according to the second embodiment, the compression of the bus band of the data bus 700 is possible to be alleviated. Further, the processing load occurring when the display processing unit 400 generates the display image is possible to be reduced.

Furthermore, in the imaging device 20 according to the second embodiment, the synthesizing unit 224 generates the synthesis image data in which the image data that has been subjected to the resizing (reducing) process is synthesized in units of frames. Thus, in the imaging device 20 according to the second embodiment, the processing load occurring when the synthesizing unit 224 performs the synthesis process is possible to be reduced.

In addition, in the imaging device 20 according to the second embodiment, the resizing processing unit 225 is added between the processing unit 222*c* and the synthesizing unit 224 as illustrated in the block diagram of FIG. 5. However, the position of the resizing processing unit included in the imaging device 20 is not limited to the position illustrated in FIG. 5. For example, the resizing processing unit that performs the resizing (reducing) process may be configured to be positioned as illustrated in FIG. 9.

<First Modified Example of Second Embodiment>

Figure 7:
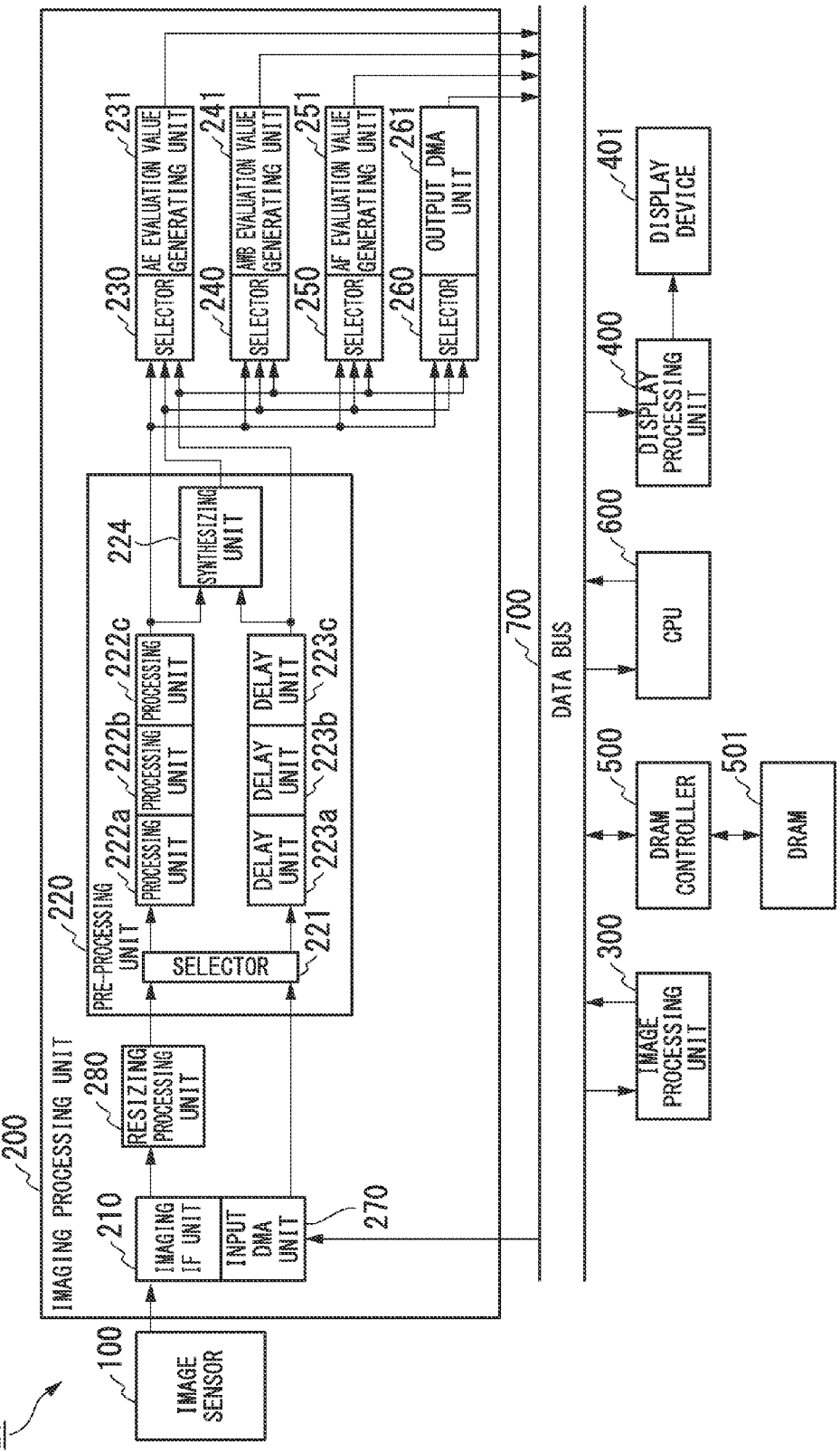
FIG. 7 is a block diagram illustrating another schematic configuration of the imaging device according to the second embodiment.

FIG. 7 is a block diagram illustrating another schematic configuration of the imaging device 20 according to the second embodiment. In the following description, an imaging device illustrated in FIG. 7 is referred to as an imaging device 21. The imaging device 21 is different from the imaging device 20 illustrated in FIG. 5 in that in the imaging processing unit 200, a resizing processing unit 280 is arranged between the imaging IF unit 210 and the selector 221 in the pre-processing unit 220 instead of the resizing processing unit 225. The remaining components are the same as in the imaging device 20 according to the second embodiment. Thus, the imaging device 21 will be described focusing on a configuration and an operation different from those of the imaging device 20 according to the second embodiment, and thus a detailed description thereof will not be provided here.

The imaging IF unit 210 outputs the image data (the captured image of the current frame) according to the pixel signal input from the image sensor 100 to the resizing processing unit 280.

For example, the resizing processing unit 280 resizes (reduces) the image data input from the imaging IF unit 210 to a predetermined image size that does not lower the accuracy of the evaluation value generated by each evaluation value generating unit. Then, the resizing processing unit 280 outputs the resized (reduced) image data to the selector 221 in the pre-processing unit 220 as the resized (reduced) captured image of the current frame. A method of the resizing (reducing) process by the resizing processing unit 280 is similar to the method of the resizing (reducing) process performed by the resizing processing unit 225 except for the resizing (reducing) size of the image data, that is, the reduction rate of the image data, and thus a detailed description thereof will not be provided here.

The resizing processing unit 280 has a function of deciding whether or not to execute the resizing (reducing) process on the image data input from the imaging IF unit 210, that is, a function of turning on or off the resizing (reducing) process. The switching between on and off of the resizing (reducing) process by the resizing processing unit 280 is controlled by the CPU 600 in each process of the evaluation value generating operation and the image display operation in the imaging device 20.

The selector 221 selects output destinations of the image data, which has been subjected to the resizing (reducing) process (the captured image of the current frame that has been subjected to the resizing (reducing) process), input from the resizing processing unit 280 and the image data input from the input DMA unit 270 (the captured image of the previous frame that has been subjected to the resizing (reducing) process). More specifically, the selector 221 outputs the image data input from the resizing processing unit 280 to either the processing unit 222a or the delay unit 223a. Further, the selector 221 outputs the image data input from the input DMA unit 270 to either the processing unit 222a or the delay unit 223a.

Then, the imaging device 21 performs the evaluation value generating operation and the image display operation in the same process as in the imaging device 10 according to the first embodiment in a state in which the resizing (reducing) process by the resizing processing unit 280 is turned on. As a result, the image size 261o1 (see the process 1) illustrated in FIG. 4A and the image size 261o2 (see the process 2) illustrated in FIG. 4B which are to be stored in the DRAM 501 by the output DMA unit 261 are reduced. Further, the image size 270i (see the process 2) illustrated in FIG. 4B which is to be acquired (read) from the DRAM 501 by the input DMA unit 270 is reduced.

As a result, the imaging device 21 illustrated in FIG. 7 is possible to reduce the size of image data which is simultaneously present on the data bus 700 while securing the accuracy of the evaluation value generated by the evaluation value generating unit. Thus, in the imaging device 21 illustrated in FIG. 7, the compression of the bus band of the data bus 700 is possible to be alleviated, and a load of display processing in the display processing unit 400 is possible to be alleviated. Further, in the imaging device 21 illustrated in FIG. 7, since the size of image data to be synthesized in units of frames by the synthesizing unit 224 is reduced, a load of the synthesis process in the synthesizing unit 224 is also possible to be alleviated.

In the imaging device 20 according to the second embodiment, the single resizing processing unit 225 is added between the processing unit 222c and the synthesizing unit 224 as illustrated in the block diagram of FIG. 5. However, the number of resizing processing units included in the imaging device 20 is not limited to one. For example, a plurality of resizing processing units may be arranged as illustrated in FIG. 8.

<Second Modified Example of Second Embodiment>

Figure 8:
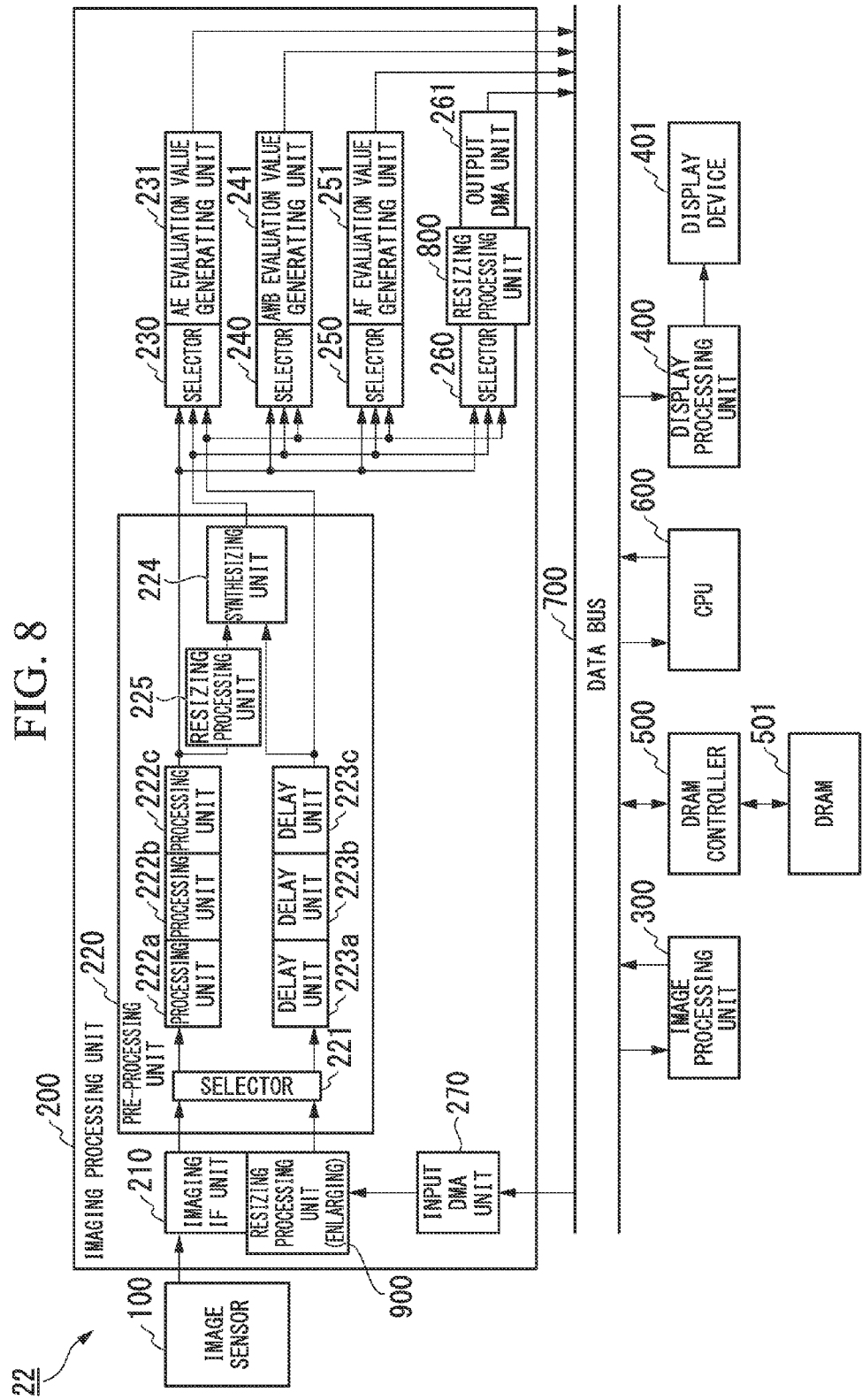
FIG. 8 is a block diagram illustrating another schematic configuration of the imaging device according to the second embodiment.

FIG. 8 is a block diagram illustrating another schematic configuration of the imaging device 20 according to the second embodiment. In the following description, an imaging device illustrated in FIG. 8 is referred to as an imaging device 22. The imaging device 22 is different from the imaging device 20 illustrated in FIG. 5 in that in the imaging processing unit 200, a resizing processing unit 800 is added between the selector 260 and the output DMA unit 261, and a resizing processing unit 900 is added between the input DMA unit 270 and the selector 221 in the pre-processing unit 220. The remaining components are the same as in the imaging device 20 according to the second embodiment. Thus, the imaging device 22 will be described focusing on a configuration and an operation different from those of the imaging device 20 according to the second embodiment, and thus a detailed description thereof will not be provided here.

In the imaging device 22 illustrated in FIG. 8, for example, the resizing processing unit 225 resizes (reduces) the pre-processed image data input from the processing unit 222c to a predetermined image size that does not lower the accuracy of the evaluation value generated by each evaluation value generating unit. A method of the resizing (reducing) process of the resizing processing unit 225 is different in the resizing (reducing) size (the reduction rate) of the image data.

For example, the resizing processing unit 800 resizes (reduces) the image data input from the selector 260 to a predetermined image size which is possible to be displayed on the display device 401. Then, the resizing processing unit 800 outputs the resized (reduced) image data to the output DMA unit 261 as original image data to be displayed on the display device 401. In the method of the resizing (reducing) process by the resizing processing unit 800, the image data resized (reduced) by the resizing processing unit 225 is input from the selector 260. In other words, as the size of input image data is different, the resizing (reducing) size (the reduction rate) of the image is different, but since the method of the resizing (reducing) process performed by the resizing processing unit 225 is similar, a detailed description thereof will not be provided here.

The resizing processing unit 800 has a function of deciding whether or not to execute the resizing (reducing) process on the image data input from the selector 260, that is, a function of turning on or off the resizing (reducing) process. The switching between on and off of the resizing (reducing) process by the resizing processing unit 800 is controlled by the CPU 600 in each process of the evaluation value generating operation and the image display operation in the imaging device 20.

The input DMA unit 270 acquires (reads) the image data (the captured image of the previous frame) stored in the DRAM 501 by the DMA via the DRAM controller 500, and outputs the acquired image data to the resizing processing unit 900.

The resizing processing unit 900 resizes (enlarges) the image data input from the input DMA unit 270 to the size of the pre-processed resized image data which has been subjected to the resizing (reducing) process by the resizing processing unit 225, that is, the size of the captured image of the second frame. Then, the resizing processing unit 900 outputs the resized (enlarged) image data to the pre-processing unit 220. For example, a method of the resizing (enlarging) process by the resizing processing unit 900 is similar to a reverse method to the resizing (reducing) process performed by the display processing unit 400, and thus a detailed description thereof will not be provided here.

The resizing processing unit 900 has a function of deciding whether or not to execute the resizing (enlarging) process on the image data input from the input DMA unit 270, that is, a function of turning on or off the resizing (enlarging) process. The switching between on and off of the resizing (enlarging) process by the resizing processing unit 900 is controlled by the CPU 600 in each process of the evaluation value generating operation and the image display operation in the imaging device 20.

The selector 221 selects output destinations of the image data (the captured image of the current frame) input from the imaging IF unit 210, and the image data (the captured image of the previous frame) input from the resizing processing unit 900. More specifically, the selector 221 outputs the image data input from the imaging IF unit 210 to either the processing unit 222a or the delay unit 223a. Further, the selector 221 outputs the image data input from the resizing processing unit 900 to either the processing unit 222a or the delay unit 223a.

Then, the imaging device 22 performs the evaluation value generating operation and the image display operation in the same process as in the imaging device 20 illustrated in FIGS. 6A and 6B in a state in which the resizing (reducing) processes by the resizing processing unit 225 and the resizing processing unit 800 are turned on, and the resizing (enlarging) process by the resizing processing unit 900 is turned on. As a result, the image size 261oS (see the process 1) illustrated in FIG. 6A and the image size 261oS (see the process 2) illustrated in FIG. 6B which are to be stored in the DRAM 501 by the output DMA unit 261 become the same size as in the example of the operation illustrated in FIGS. 6A and 6B. Further, the image size 270iS (see the process 2) illustrated in FIG. 6B which is to be acquired (read) from the DRAM 501 by the input DMA unit 270 also becomes the same size as in the example of the operation illustrated in FIGS. 6A and 6B.

Further, in the imaging device 22, the image size 224oS1 (see the process 1) illustrated in FIG. 6A and the image size 224oS2 (see the process 2) illustrated in FIG. 6B become larger than in the example of the operation illustrated in FIGS. 6A and 6B. However, in the imaging device 22, the resizing processing unit 225 outputs the pre-processed resized image data (the Bayer data) in which the resizing (reducing) process is performed to resize (reduce) the pre-processed image data to the size that does not lower the accuracy of the evaluation value generated by each evaluation value generating unit. Further, the resizing processing unit 900 resizes (enlarges) the image data input from the input DMA unit 270 to the size of the pre-processed resized image data which has been subjected to the resizing (reducing) process by the resizing processing unit 225. As a result, the synthesizing unit 224 is possible to output the synthesis image data with a size that does not lower the accuracy of the evaluation value presented by each evaluation value generating unit. Thus, the imaging device 22 is possible to generate the evaluation value with a high accuracy even based on the synthesis image data.

As described above, the imaging device 22 illustrated in FIG. 8 finally resizes (reduces) the image data to a predetermined image size that is possible to be displayed on the display device 401 by a plurality of resizing processing units (the resizing processing unit 225 and the resizing processing unit 800 in the schematic configuration illustrated in FIG. 8). Thus, in the imaging device 22 illustrated in FIG. 8, the compression of the bus band of the data bus 700 is possible to be alleviated, and the processing load occurring when the display processing unit 400 generates the display image is possible to be reduced.

Further, in the imaging device 22 illustrated in FIG. 8, the resizing processing unit 225 resizes (reduces) the pre-processed image data to the size that does not lower the accuracy of the evaluation value presented by each evaluation value generating unit. Thus, the imaging device 22 illustrated in FIG. 8 is also possible to alleviate a load of the synthesis process when the synthesizing unit 224 synthesizes the image in units of frames while securing the accuracy of the evaluation value generated by the evaluation value generating unit.

As described above, in the embodiment for implementing the present invention, the input DMA unit (the input DMA unit 270 in the present embodiment) that acquires (reads) the image data stored in the DRAM is disposed in the imaging processing unit of the imaging device. Further, the selectors (the selector 230, the selector 240, and the selector 250 in the present embodiment) that select the image data to be input to the corresponding evaluation value generating units are disposed at the stage (an input unit of image data) before the evaluation value generating units (the AE evaluation value generating unit 231, the AWB evaluation value generating unit 241, and the AF evaluation value generating unit 251 in the present embodiment) included in the imaging processing unit. Further, the synthesizing unit (the synthesizing unit 224 in the present embodiment) that generates the synthesis image data in which the image data of the current frame is synthesized with the image data of the previous frame is disposed in the pre-processing unit (the pre-processing unit 220 in the present embodiment) included in the imaging processing unit.

Thus, according to the embodiment for implementing the present invention, by increasing the frame rate (the imaging frame rate) of the image data for acquiring the pixel signal from the image sensor (the image sensor 100 in the present embodiment) and generating the evaluation value, the imaging device capable of more evaluation values is possible to be implemented. In this case, the image is possible to be displayed on the display device at the frame rate (the display frame rate) at which the image is possible to be displayed on the display device (the display device 401 in the present embodiment) included in the imaging device (the imaging device 10 and the imaging device 20 in the present embodiment) without thinning out the captured image of each frame acquired from the image sensor, that is, without reducing information of the image data.

Further, according to the embodiment for implementing the present invention, image data which is input to the evaluation value generating unit and used to generate the evaluation value is possible to be switched to any one of image data input in real time, image data stored in the DRAM, and image data in which image data of respective frames is synthesized. Thus, according to the embodiment for implementing the present invention, the evaluation values based on diverse image data is possible to be generated using the same evaluation value generating unit (by diverting the same evaluation value generating unit).

More specifically, for example, in the imaging device 10 according to the first embodiment, the CPU 600 controls the selector 221 and selects image data to be transferred to the processing units 222*a* to 222*c* and the delay units 223*a* to 223*c*. Further, the CPU 600 controls the selector 230, the selector 240, the selector 250, and the selector 260, and selects the image data to be input to the AE evaluation value generating unit 231, the AWB evaluation value generating unit 241, the AF evaluation value generating unit 251, and the output DMA unit 261. Thus, in the imaging device 10 according to the first embodiment, the image data used to generate the evaluation value and the image data to be stored in the DRAM 501 is possible to be switched. In other words, in the imaging device 10 according to the first embodiment, the AE evaluation value, the AWB evaluation value, and the AF evaluation value is possible to be generated based on the image data of the current frame according to the pixel signal output from the image sensor 100, the image data of the previous frame acquired (read) via the DRAM controller 500, or the image data in which the image data of the current frame is synthesized with the image data of the previous frame. Thus, the evaluation value used to perform AE, AWB, and AF control related to capturing is possible to be obtained from appropriate image data at a necessary timing. For example, in control that need not be performed at a high speed, the evaluation value is obtained at the display frame rate based on the synthesis image data, and thus appropriate control is possible to be performed without increasing power consumption of the imaging device 10 to be more than necessary.

Further, according to the embodiment for implementing the present invention, the resizing processing unit (the resizing processing unit 800 in the present embodiment) that resizes (reduces) the image data is disposed in the imaging processing unit. Thus, according to the embodiment for implementing the present invention, when the captured image according to the pixel signal input from the image sensor is sequentially displayed on the display device, the compression of the bus band of the data bus is possible to be alleviated. Accordingly, the display processing unit is possible to alleviate the processing load occurring when the display image is generated. Particularly, in the present embodiment, the input DMA unit 270 acquires (reads) the captured image stored in the DRAM 501. When the output DMA unit 261 stores the synthesis image data in the DRAM 501, the image data of the captured image corresponding to two frames is simultaneously presented on the data bus 700, but by reducing the size of the image data of the captured image corresponding to the two frames, the compression of the bus band of the data bus 700 is possible to be alleviated.

Further, according to the embodiment for implementing the present invention, the resizing processing unit is disposed at the stage (an input unit of image data) before the synthesizing unit in the pre-processing unit. Thus, according to the embodiment for implementing the present invention, the processing load occurring when the synthesizing unit generates the synthesis image data is possible to be reduced. As a result, in the embodiment for implementing the present invention, when the synthesizing unit synthesizes image data in units of frames, even though the image data of the captured image of each frame output from the image sensor is input to the synthesizing unit at the high imaging frame rate, the synthesis process is possible to be performed without increasing the load of the synthesis process.

Further, according to the embodiment for implementing the present invention, when the resizing processing unit performs the resizing (reducing) process, the image data is possible to be resized (reduced) to the size that does not lower the accuracy of the evaluation value generated by the evaluation value generating unit. Thus, according to the embodiment for implementing the present invention, the accuracy of the evaluation value generated by the evaluation value generating unit is possible to be secured, and the load of the synthesis process occurring when the synthesizing unit synthesizes the image data in units of frames is possible to also be alleviated.

In the present embodiment, for example, in the imaging device 10, the imaging IF unit 210 processes the captured image of the current frame and the captured image of the previous frame at the same timing. This is done by the selector 221 and the delay units 223*a* to 223*c* disposed in the pre-processing unit 220. As a method of simultaneously processing different pieces of image data acquired at different timings by the imaging IF unit 210, for example, a method in which the CPU 600 controls a timing to acquire (read) the captured image of the previous frame stored in the DRAM 501 by the input DMA unit 270 may be considered. However, it is not easy for the CPU 600 to perform control at the same timing as the captured image of the current frame input the imaging IF unit 210 in real time. In the imaging device 10, the delay units 223*a* to 223*c* are disposed in the pre-processing unit 220, and thus the timing of the captured image of the previous frame is possible be easily matched with a timing of the captured image of the current frame acquired in real time.

More specifically, for example, in the imaging device 10, the selector 221 transfers the captured image of the current frame input from the imaging IF unit 210 in real time to the processing unit 222*a*. Further, the imaging device 10 transfers the captured image of the previous frame, which is acquired by the imaging IF unit 210 and then input from the input DMA unit 270, to the delay unit 223*a*. Further, the delay units 223*a* to 223*c* matches the captured image of the previous frame previously acquired by the imaging IF unit 210 in a timing with the captured image of the current frame on which the processing units 222*a* to 222*c* perform pre-processing (a correction process) in real time. In other words, two pieces of image data to be subjected to the synthesis process at the same timing are input to the synthesizing unit 224. Thus, the synthesizing unit 224 is possible to perform the synthesis process on different pieces of image data acquired at different timings by the imaging IF unit 210.

Further, the present embodiment has been described in connection with the example in which the three corresponding delay units 223*a* to 223*c* are disposed in the processing units 222*a* to 222*c* in the pre-processing unit 220, respectively, and the delay units 223*a* to 223*c* delay the input image data by the same time as the delay time from the input of the processing units 222*a* to 222*c* to the output thereof and then output the delayed image data. However, the configuration of the delay unit is not limited to the embodiment for implementing the present invention. For example, one delay unit that delays the input image data by a total delay time of the pre-processing (correction process) by the processing units 222*a* to 222*c* and outputs the delayed image data may be provided instead of the delay units 223*a* to 223*c*.

Further, the present embodiment has been described in connection with the example in which the delay units 223*a* to 223*c* are disposed in the pre-processing unit 220. However, the internal configuration of the pre-processing unit 220 is not limited to the embodiment for implementing the present invention. For example, when control is possible to be performed such that a timing of the image data acquired in real time and output by the imaging IF unit 210 matches a timing at which the input DMA unit 270 acquires (reads) the image data stored in the DRAM 501, the delay units 223a to 223c may not be disposed in the pre-processing unit 220. The selector 221 does not transfer the image data to the delay unit 223a but outputs the input image data to the synthesizing unit 224, the selector 230, the selector 240, the selector 250, and the selector 260. Thus, when the selector 221 outputs the image data to the selector 230, the selector 240, the selector 250, and the selector 260, a period of time until the evaluation value generating units end generation of the evaluation values from after the selector 221 outputs the image data is possible to be reduced.

Further, the present embodiment has been described in connection with the example in which the delay units 223a to 223c that delay the input image data by the same time as the delay time from the input of the processing units 222a to 222c to the output thereof and outputs the delayed image data are disposed in the pre-processing unit 220. However, the internal configuration of the pre-processing unit 220 is not limited to the embodiment for implementing the present invention. For example, one more set of the processing units 222a to 222c may be provided instead of the delay units 223a to 223c. In this case, pre-processing (a correction process) may simultaneously be executed on both image data input in real time and image data stored in the DRAM. In this case, the circuit size of the pre-processing unit increases, but in the imaging device, the demand for performing pre-processing (a correction process) on different pieces of image data at the same time is considered to be useful rather than an increase in the circuit size.

The embodiments of the present invention have been described above with reference to the accompanying drawings, but a concrete configuration is not limited to the above embodiments, and various changes is possible to be made in a range not departing from the gist of the present invention.

The exemplary embodiments of the present invention have been described above, but the present invention is not limited to the above embodiments. Additions, omissions, replacements, and other alternations is possible to be made in a range not departing from the gist of the present invention. The present invention is not limited to the above description but is confined only by the accompanying claims.

What is claimed is:

1. An imaging device, comprising:
an image data interface unit that outputs image data according to a pixel signal input from a solid-state imaging device as first image data;
an image data reading unit that reads image data stored in a storage unit via a data bus, and outputs the read image data as second image data;
an image synthesizing unit that generates and outputs third image data in which image data based on the first image data is synthesized with image data based on the second image data;
an evaluation value generating unit that generates an evaluation value based on input image data;
an image data writing unit that stores input image data in the storage unit via the data bus;
a second image data selecting unit that selects any one of the image data based on the first image data, and the third image data as image data to be input to the image data writing unit;
a display unit that reads the third image data stored in the storage unit by the image data writing unit, from the storage unit via the data bus, and displays an image corresponding to the read third image data; and
an image reducing unit that is arranged between the image data interface unit and the image synthesizing unit, and generates and outputs sixth image data in which input image data is reduced to a predetermined size,
wherein the image data interface unit sequentially outputs the plurality of first image data according to the pixel signal input from the solid-state imaging device during a unit period of time in which the display unit updates a display of an image,
the second image data selecting unit selects the image data based on the first image data, which is initially output from the image data interface unit after the unit period of time of the display unit starts, as the image data to be input to the image data writing unit, and then selects the third image data sequentially input until the unit period of time of the display unit ends as the image data to be input to the image data writing unit,
the image data writing unit sequentially stores the third image data input subsequently to the input initial image data based on the first image data in the storage unit,
the image data reading unit sequentially reads the third image data stored in the storage unit, subsequently to the initial image data based on the first image data stored in the storage unit as the second image data,
the image synthesizing unit sequentially outputs the third image data in which the image data based on the first image data sequentially output from the image data interface unit is sequentially synthesized with the image data based on the second image data read by the image data reading unit,
the display unit displays an image corresponding to the third image data that is stored in the storage unit and finally synthesized by the image synthesizing unit when the unit period of time of the display unit ends,
the evaluation value generating unit sequentially generates an evaluation value based on the sequentially input image data.

2. The imaging device according to claim 1, further comprising:
a first pre-processing unit that performs predetermined processing on input image data; and
a second pre-processing unit that performs predetermined processing on input image data,
wherein the first pre-processing unit outputs image data in which predetermined processing is performed on one of the input first image data and the second image data as fourth image data,
the second pre-processing unit outputs image data in which predetermined processing is performed on the other of the input first image data and the second image data as fifth image data,
the image synthesizing unit generates third image data in which image data based on the fourth image data is synthesized with the fifth image data,
the first image data selecting unit selects any one of the third image data, the fourth image data, and the fifth image data as the image data to be input to the evaluation value generating unit, and
the second image data selecting unit selects any one of the third image data, the fourth image data, and the fifth image data as the image data to be input to the image data writing unit.

3. The imaging device according to claim 2,
wherein the image reducing unit is arranged between the first pre-processing unit and the image synthesizing unit, and generates sixth image data in which the fourth image data is reduced to a predetermined size, and
the image synthesizing unit generates third image data in which the sixth image data is synthesized with the fifth image data.

4. The imaging device according to claim 2,
wherein the image reducing unit is arranged between the image data interface unit and the first pre-processing unit, and
the image reducing unit generates the sixth image data in which the first image data is reduced to a predetermined size, and outputs the generated sixth image data as the first image data to be input to the first pre-processing unit and the second pre-processing unit, and
the image synthesizing unit generates third image data in which the fourth image data is synthesized with the fifth image data.

5. The imaging device according to claim 3,
wherein the predetermined size is the size of image data corresponding to the size of an image that is displayable by the display unit.

6. The imaging device according to claim 3,
wherein the predetermined size is the size of image data necessary for the evaluation value generating unit to generate a valid evaluation value.

7. The imaging device according to claim 3, further comprising:
a second image reducing unit that is arranged between the second image data selecting unit and the image data writing unit, reduces image data selected by the second image data selecting unit to a predetermined second size different from the size by the image reducing unit, and outputs the reduced image data as the image data to be input to the image data writing unit; and
an image enlarging unit that is arranged at a stage subsequent to the image data reading unit, enlarges the second image data read by the image data reading unit to the same size as the sixth image data output by the image reducing unit, and outputs the enlarged image data as the second image data to be input to the first pre-processing unit and the second pre-processing unit.

8. The imaging device according to claim 7,
wherein the predetermined size is the size of image data necessary for the evaluation value generating unit to generate a valid evaluation value, and
the predetermined second size is the size of image data corresponding to the size of an image that is displayable by the display unit.

9. The imaging device according to claim 3,
wherein the image synthesizing unit outputs image data based on the sixth image data according to image data initially input to the image reducing unit after the unit period of time of the display unit starts as the third image data, and then sequentially outputs the third image data in which the image data based on the sixth image data sequentially input from the image reducing unit until the unit period of time of the display unit ends is sequentially synthesized with the image data based on the second image data sequentially read by the image data reading unit, and
the second image data selecting unit selects the sequentially input third image data as the image data to be input to the image data writing unit during the unit period of time of the display unit.

10. The imaging device according to claim 9,
wherein the first pre-processing unit is at least one processing unit that performs a predetermined correction process on input image data, and
the second pre-processing unit is at least one delay unit that performs a process of delaying input image data by a predetermined amount of time and outputting the delayed image data.

11. The imaging device according to claim 10,
wherein the predetermined amount of time is equal to a delay time until the predetermined correction process is performed and corrected image data is output after image data is input to the first pre-processing unit.

12. The imaging device according to claim 9,
wherein the first pre-processing unit is at least one processing unit that performs a predetermined correction process on input image data, and
the second pre-processing unit is at least one second processing unit that performs a predetermined correction process on input image data.

13. The imaging device according to claim 11,
wherein the first image data selecting unit selects any one of the fourth image data and the fifth image data based on the first image data as the image data to be input to the evaluation value generating unit when the evaluation value generating unit generates an evaluation value based on image data according to the pixel signal input from the solid-state imaging device,
the first image data selecting unit selects any one of the fourth image data and the fifth image data based on the second image data as the image data to be input to the evaluation value generating unit when the evaluation value generating unit generates an evaluation value based on image data stored in the storage unit, and
the first image data selecting unit selects the third image data as the image data to be input to the evaluation value generating unit when the evaluation value generating unit generates an evaluation value based on the third image data.

14. The imaging device according to claim 13,
wherein the imaging device comprises a plurality of evaluation value generating units and a plurality of first image data selecting units that correspond to the plurality of evaluation value generating units, and
each of the first image data selecting units selects any one of the third image data, the fourth image data which is based on one of the first image data and the second image data, and the fifth image data which is based on one of the first image data and the second image data, which is used for the corresponding evaluation value generating unit to generate an evaluation value, as image data to be input to the corresponding evaluation value generating unit.

15. The imaging device according to claim 14,
wherein at least one of the first image data selecting units selects any one of the fourth image data and the fifth image data, which is based on one of the first image data and the second image data, which is used for the corresponding evaluation value generating unit to generate an evaluation value, as image data to be input to the corresponding evaluation value generating unit, and
at least another of the first image data selecting units selects the other of the fourth image data and the fifth image data, which is based on the other of the first image data and the second image data, which is used for the corresponding evaluation value generating unit to generate an evaluation value, or the third image data, as the image data to be input to the corresponding evaluation value generating unit.

\* \* \* \* \*